(12) United States Patent
Miyamoto et al.

(10) Patent No.: US 7,307,235 B2
(45) Date of Patent: *Dec. 11, 2007

(54) BUTT WELDING APPARATUS, BUTT WELDING METHOD, AND BUTT WELDED PRODUCT

(75) Inventors: Yutaka Miyamoto, Hamura (JP); Takao Minagawa, Hamura (JP); Shinichi Inagaki, Hamura (JP); Kazu Uchida, Hamura (JP); Kiyoyuki Fukui, Amagasaki (JP)

(73) Assignee: Kikuchi Co., Ltd., Tokyo (JP)

( * ) Notice: Subject to any disclaimer, the term of this patent is extended or adjusted under 35 U.S.C. 154(b) by 195 days.

This patent is subject to a terminal disclaimer.

(21) Appl. No.: 10/486,273

(22) PCT Filed: Jan. 9, 2003

(86) PCT No.: PCT/JP03/00122

§ 371 (c)(1),
(2), (4) Date: Feb. 5, 2004

(87) PCT Pub. No.: WO03/068443

PCT Pub. Date: Aug. 21, 2003

(65) Prior Publication Data

US 2005/0011864 A1   Jan. 20, 2005

(30) Foreign Application Priority Data

Feb. 12, 2002  (JP) ............................. 2002-033426
Oct. 4, 2002  (JP) ............................. 2002-291826

(51) Int. Cl.
*B23K 11/02*   (2006.01)
*B23K 11/06*   (2006.01)
(52) U.S. Cl. .................... 219/83; 219/84; 219/101; 219/102; 219/104

(58) Field of Classification Search .................. 219/81, 219/83, 84, 101–105
See application file for complete search history.

(56) References Cited

U.S. PATENT DOCUMENTS 2,036,041 A    3/1936  Granfield et al.
2,892,921 A *  6/1959  Mecklenborg ............... 219/81
3,265,277 A *  8/1966  Bacroix ..................... 228/44.3

(Continued)

FOREIGN PATENT DOCUMENTS

DE           152504        12/1981

(Continued)

*Primary Examiner*—Kevin P. Kerns
(74) *Attorney, Agent, or Firm*—Flynn, Thiel, Boutell & Tanis, P.C.

(57) ABSTRACT

A butt welding apparatus, a butt welding method, and a product manufactured by the butt welding method involves two electrode rollers disposed on both the front and back sides of a thick sheet member and a thin sheet member whose end surfaces are butted. The electrode rollers bridge across the sheet members and are composed of small diameter portions on the side of the thick sheet member and large diameter portions on the side of the thin sheet member. The small diameter portions come into contact with and press the thick sheet member before the large diameter portions come into contact with the thin sheet member. Thus, the end surface of the thick sheet member swells and deforms toward the thin sheet member and reliably comes into contact with the end surface of the thin sheet member, and power is applied between the end surfaces, even if not polished.

17 Claims, 15 Drawing Sheets

U.S. PATENT DOCUMENTS

2006/0151441 A1* 7/2006 Miyamoto et al. ............ 219/83

FOREIGN PATENT DOCUMENTS

| | | | |
|---|---|---|---|
| FR | 2 733 528 | | 10/1996 |
| GB | 867 588 | | 5/1961 |
| JP | 45-5136 | | 2/1970 |
| JP | 60-6273 | * | 1/1985 |
| JP | 60-006273 | | 1/1985 |
| JP | 62-179183 | | 11/1987 |
| JP | 03-060874 | | 3/1991 |
| JP | 8-39261 | * | 2/1996 |
| JP | 8-39261 A | * | 2/1996 |
| JP | 2000-167673 | * | 6/2000 |
| JP | 2000-167673 A | * | 6/2000 |
| JP | 2000-254785 A | * | 9/2000 |
| JP | 2001-18071 | | 1/2001 |
| WO | WO 01/68435 A1 | | 9/2001 |

* cited by examiner

F I G. 1 2
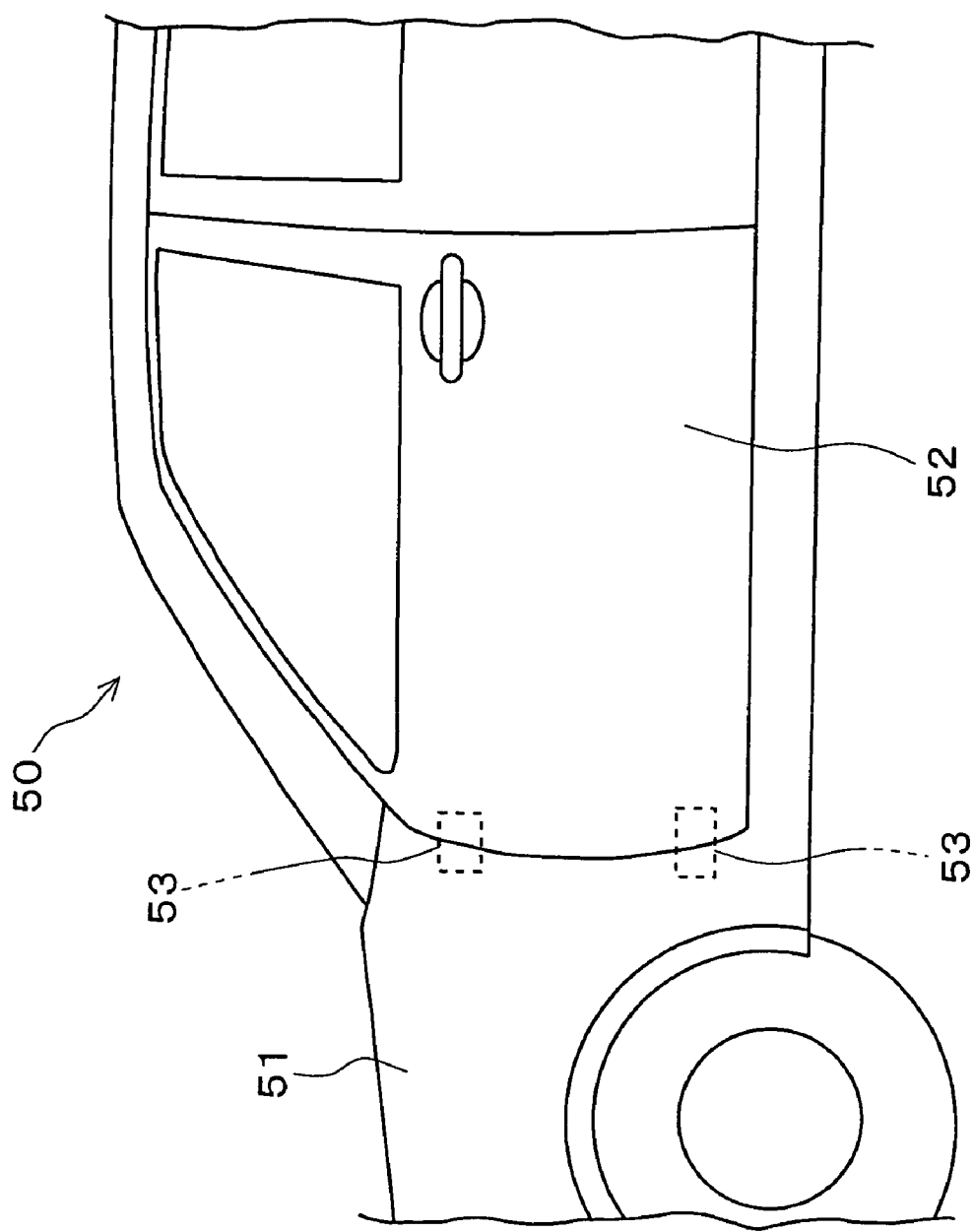

F I G. 2 1
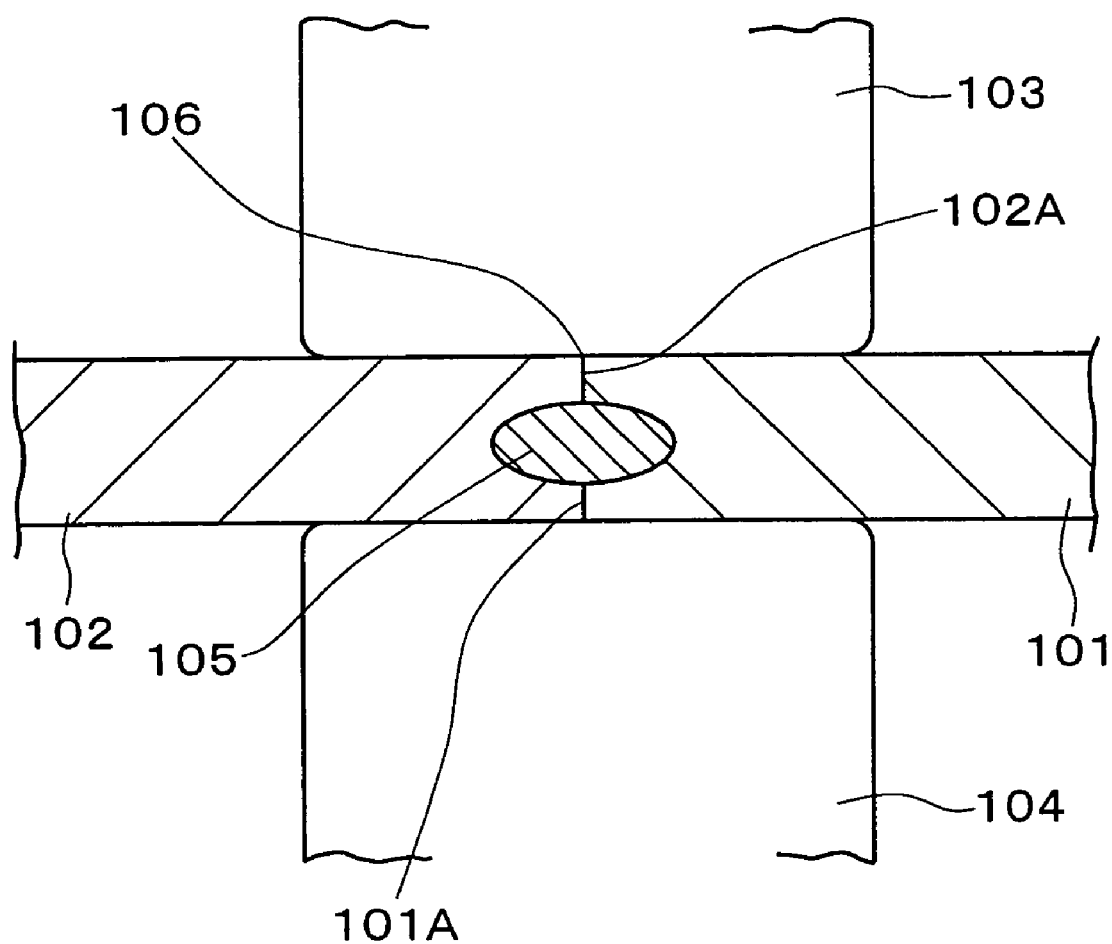
Prior Art

BUTT WELDING APPARATUS, BUTT WELDING METHOD, AND BUTT WELDED PRODUCT

BACKGROUND OF THE INVENTION

1. Technical Field

The present invention relates to a butt welding apparatus for and a butt welding method of melting and jointing a butt portion where end surfaces of two welding sheet members are butted to each other with electric resistance heat generated by power applied between a pair of two electrode members, and to a butt welded product manufactured by the butt welding method.

2. Background Art

FIG. 21 shows a conventional butt welding apparatus. Two welding sheet members 101, 102 having the same thickness are set to the welding apparatus with end surfaces 101A, 102A butted to each other. Each of electrode rollers 103, 104 disposed on both the front and back surface sides of the sheet members 101, 102 has a thickness bridging across the sheet members 101, 102, and power is applied between the electrode rollers 103, 104 when the sheet members 101, 102 are welded. When the power is applied between the electrode rollers 103, 104 while they press both the sheet members 101, 102, the metal material of the sheet members 101, 102 is melted and a nugget 105 is formed in the sheet members 101, 102 at a central portion in the thickness thereof where an electric resistance is increased in the sheet members 101, 102 by the resistance heat of the power flowing in the thickness direction of both the sheet members 101, 102. Further, since the power also flows through a path passing through a butt portion 106 where the end surfaces 101A, 102A are butted to each other, the butt portion 106 is also melted at a central portion in the thickness thereof by the heat generated by the contact resistance of these end surfaces 101A, 102A. Thus, the nugget 105 is formed so as to bridge across both the sheet members 101, 102.

Then, when the electrode rollers 103, 104 move along the butt portion 106 while rolling or when the sheet members 101, 102 move with respect to the electrode rollers 103, 104 that are free to move at a definite position, the nugget 105, which can joint the sheet members 101, 102 with a large amount of strength, is formed over the entire length of the butt portion 106.

To form the nugget 105 bridging across both the sheet members 101, 102, an electrically conductive state must be secured by causing the end surface 101A of the sheet member 101 to be butted to come into contact with the end surface 102A of the sheet member 102. Thus, conventionally, both the end surfaces 101A, 102A are polished over the entire lengths thereof prior to butt welding so as to secure a contact state of the end surfaces 101A, 102A in the butt welding.

Therefore, conventionally, welding sheet members, for example, sheared in predetermined sizes by a shearing apparatus cannot be butt welded in a sheared state and must be subjected to finish processing to the end surfaces 101A, 102A prior to a welding operation, which increases a working cost and a working time.

An object of the present invention is to provide a butt welding apparatus and a butt welding method capable of eliminating processing such as polishing, and the like for finishing the end surfaces of two welding sheet members to be butted prior to butt welding, and to provide a butt welded product capable of being manufactured by the butt welding method.

DISCLOSURE OF THE INVENTION

In a butt welding apparatus according to the present invention having a pair of two electrode members disposed on both the front and back sides of two welding sheet members whose end surfaces are butted and each having a thickness bridging across the welding sheet members for melting the butt portion of the two welding sheet members with electric resistance heat by supplying power between the electrode members and jointing the welding sheet members, the butt welding apparatus is characterized by comprising press portions formed in the pair of electrode members for pressing one of the two welding sheet members in the thickness direction thereof and for swelling and deforming the end surface of the one welding sheet member, which faces the other welding sheet member, toward the other welding sheet member by pressing the one welding sheet.

According to the butt welding apparatus, the pair of electrode members are provided with the press portions by which the one of the two sheet members is pressed in the thickness direction of the sheet members, and the end surface of the one sheet member, which faces the other sheet member, is swelled and deformed toward the other sheet member by being pressed, thereby the contact state of the end surfaces of the two sheet members is reliably secured.

Thus, it is not necessary to subject the end surfaces of the two sheet members to processing such as polishing and the like to finish them prior to butt welding, by which an overall job cost and an overall working time can be reduced.

The butt welding apparatus according to the present invention can be applied to cases in which two sheet members have various thicknesses and are butted in various butt states.

A first specific example of the cases resides in a case in which one of the two sheet members is a thick sheet member having a large thickness and the other of them is a thin sheet member having a small thickness, and the thick sheet member is butted to the thin sheet member by dislocating the both the front and back surfaces of the thin sheet member with respect to the both the front and back surfaces of the thick sheet member and by disposing the thin sheet member within the thickness of the thick sheet member. In this case, each of the pair of electrode members has a first portion on the side of the thick sheet member and a second portion on the side of the thin sheet member, the first and second portions being disposed side by side in the thickness direction of the electrode members, and the second portions project in the press direction with respect to the first portions acting as the press portions.

According to the first specific example, when the thick sheet member is pressed by the first portions of the respective electrode members acting as the press portions, the end surface of the thick sheet member, which faces the thin sheet member, swells and deforms toward the thin sheet member, and the end surface of the thick sheet member is caused to reliably come into contact with the end surface of the thin sheet member by the swelling and deformation. Then, since the second portions of the respective electrode members come into contact with the thin sheet member thereafter, the butt portion of the end surfaces of the two sheet members is melted by electric resistance heat by supplying power between the electrode members until the second portions come into contact with the thin sheet member. As a result, a nugget bridging across these sheet members is formed.

Note that, in the first example, the boundaries between the first portions and the second portions of the respective electrode members may be in agreement with the position of the butt portion of the thick and thin sheet members. However, it is preferable that the first portions of the respective electrode members have a thickness extending toward the thin sheet member across the butt portion.

According to the above arrangement, gaps are formed between the end surface of the thick sheet member facing the thin sheet member and the second portions of the respective electrode members. Thus, when the thick sheet member is pressed by the first portions of the respective electrode members, the end surface of the thick sheet member facing the thin sheet member can be reliably swelled and deformed toward the thin sheet member.

A second specific example resides in a case in which the two sheet members have the same thickness, and these sheet members are butted by causing both the front and back surfaces of the sheet members to be in agreement with each other. In this case, each of the pair of electrode members has a first portion on the side of one of the two welding sheet members and a second portion on the side of the other of them, the first and second portions being disposed side by side in the thickness direction of the electrode members, and the second portions retract in a direction opposite to the press direction with respect to the respective first portions acting as the press portions.

According to the second specific arrangement, when the one of the two sheet members is pressed by the first portions of the respective electrode members acting as the press portions, the end surface of the one sheet member facing the other sheet member swells and deforms toward the other sheet member, and the end surfaces of the two sheet members are caused to reliably come into contact with each other by the swelling and deformation. Then, since the second portions of the respective electrode members come into contact with the other sheet member thereafter, the butt portion of the end surfaces of the two sheet members is melted by electric resistance heat by supplying power between the electrode members until the second portions come into contact with the other sheet member. As a result, a nugget bridging across the sheet members is formed.

A third specific example resides in a case in which one of the two sheet members is a thick sheet member having a large thickness and the other of them is a thin sheet member having a small thickness, and the thick sheet member is butted to the thin sheet member by causing one of both the front and back surfaces of the thick sheet member to be in agreement with one of both the front and back surfaces of the thin sheet member without step. In this case, one of the pair of electrode members disposed on the side of the surfaces of the thick and thin sheet members where a step is arisen has a first portion on the side of the thick sheet member and a second portion on the side of the thin sheet member, the first and second portions being disposed side by side in the thickness direction of the electrode members and the second portion projecting more than the first portion in the press direction, the other electrode member comes into contact with both the thick and thin sheet members, and the portion of the other electrode member corresponding to the thick sheet member and the first portion of the one electrode member act as the press portions.

According to the third specific arrangement, when the thick sheet member is pressed by the press portions of the respective electrode members, the end surface of the thick sheet member facing the thin sheet member swells and deforms toward the thin sheet member, and the end surface of the thick sheet member is caused to reliably come into contact with the end surface of the thin sheet member by the swelling and deformation. Then, since the second portion of the one electrode member comes into contact with the thin sheet member thereafter and both the electrode members are caused to come into contact with the thin sheet member thereby, the butt portion of the end surfaces of the two sheet members is melted by electric resistance heat by supplying power between the electrode members until both the electrode members come into contact with the thin sheet member. As a result, a nugget bridging across the sheet members is formed.

In the third example, the boundary between the first and second portions of the one electrode member may be in agreement with the position of the butt portion of the thick and thin sheet members. However, it is preferable that the first portion of the electrode member have a thickness extending toward the thin sheet member across the butt portion.

According to the above arrangement, a gap is formed between the end surface of the thick sheet member facing the thin sheet member and the second portion of the one electrode member. Thus, when the thick sheet member is pressed by the press portions of the pair of electrode members, the end surface of the thick sheet member facing the thin sheet member can be reliably swelled and deformed toward the thin sheet member.

Similarly to the third specific example, a fourth specific example also resides in a case in which one of the two sheet members is a thick sheet member having a large thickness and the other of them is a thin sheet member having a small thickness, the thick sheet member is butted to the thin sheet member by causing one of both the front and back surfaces of the thick sheet member to be in agreement with one of both the front and back surfaces of the thin sheet member without step. In the fourth specific example, one of the pair of electrode members disposed on the side of the surfaces of the thick and thin sheet members in agreement with each other without step has a first portion on the side of the thick sheet member and a second portion on the side of the thin sheet member, the first and second portions being disposed side by side in the thickness direction of the electrode members, the first and second portions project toward the thick and thin sheet members in the same amount, the other of the electrode members also has a first portion on the side of the thick sheet member and a second portion on the side of the thin sheet member, the first and second portions being disposed side by side in the thickness direction of the electrode members, the second portion of the first and second portions projects more than the first portion toward the thin sheet member, the second portion of the one electrode member and the first portion of the other electrode member have electric conductivity, the first portion of the one electrode member and the second portion of the other electrode member have an electric insulating property, and the first portion of the one electrode member and first portion of the other electrode member act as the press portions.

According to the fourth specific example, when the thick sheet member is pressed by the first portions of the respective electrode members acting as the press portions, the end surface of the thick sheet member facing the thin sheet member swells and deforms toward the thin sheet member, and the end surface of the thick sheet member is caused to reliably come into contact with the end surface of the thin sheet member by the swelling and deformation. Then, since the second portion of the one electrode member having the conductivity is in contact with the thin sheet member and the first portion of the other electrode member having the conductivity likewise is in contact with the thick sheet member, power flows through the path obliquely passing through the butt portion of the end surfaces of the thick and thin sheet members, thereby the butt portion is melted by electric resistance heat, and, as a result, a nugget bridging across the thick and thin sheet members is formed.

In the butt welded apparatus of the present invention including-the respective examples described above, the pair of two electrode members may be composed of electrode rollers that roll with respect to two sheet members or may be composed of block electrodes that have a length extending along the butt portion of two sheet members and act a press load on the sheet members.

When the electrode members are composed of the latter block electrodes, a butt welding operation of two sheet members can be finished by a job for pressing the butt portion of these sheet members with the respective electrode members once, which can reduce a butt welding working hours and permits a multiplicity of butt welding operations to be carried out effectively.

Further, when the electrode members are composed of the block electrodes, the butt portion of two sheet members may extend linearly or may extend non-linearly. When the butt portion extends non-linearly, the respective electrode members are formed in a shape extending in correspondence to the butt portion extending non-linearly.

That is, when the electrode members are composed of the block electrodes, two sheet members whose butt portion extends non-linearly can be butt welded by the block electrodes, while it is impossible or difficult to butt-weld them when the electrode members are composed of electrode rollers. The above arrangement is advantageous in that when two sheet members to be butted are manufactured from blank members by shearing them in arbitrary shapes according to, for example, the shape and the like of a product manufactured from the two sheet members by butting them, the two sheet members can be formed in any arbitrary butt shape.

Note that the term "non-linear shape" described above includes linear lines connected to each other while curving midway, a curved line including a circular arc, a linear line connected to a curved line, and further a curved line connected to a curved line.

When the pair of two electrode members in the butt welding apparatus of the present invention are composed of the electrode rollers described above, the butt welding apparatus of the present invention may be provided with a cooling liquid dropping unit for dropping a cooling liquid onto portions just behind the portions of two sheet members butt welded by these electrode rollers.

According to the above arrangement, when a butt welding operation is executed using the pair of electrode rollers, the cooling liquid dropping unit drops the cooling liquid such as water, oil, and the like onto the portions just behind the portions in the two sheet members butt welded by the electrode rollers. It can be prevented or reduced by cooling the welded portions by dropping the cooling liquid onto them just after they are welded that the two sheet members extend and deform and that the gap between the portions of the two sheet members to be welded from now enlarges. Thus, one of the two sheet members is pressed by the press portions of the pair of electrode rollers and the end surface of the one sheet member is swelled and deformed by pressing it as well as a more reliable contact state of the end surfaces of these sheet members can be secured.

Further, the butt welding apparatus of the present invention may be provided with an anti-oxidation gas supply unit for supplying an anti-oxidation gas such as an argon gas, a nitrogen gas, and the like onto at least a portion butt welded by the pair of electrode members in the two welding sheet members.

According to the above arrangement, a welding operation is executed in an anti-oxidization gas atmosphere, thereby the occurrence of rust at a welded butt portion can be prevented or reduced. As a result, when a product is made of a material of two butted sheet members, necessary jobs such as a painting job and the like can be carried out as prescribed.

In a butt welding method according to the present invention of butting end surfaces of two welding sheet members and jointing the butt portion of the two welding sheet members by melting the butt portion with electric resistance heat by supplying power between a pair of two electrode members disposed on both the front and back sides of the welding sheet members and each having a length bridging across the welding sheet members, the butt welding method is characterized by comprising the steps of pressing one of the two welding sheet members in the thickness direction thereof by the pair of electrode members being applied with power and swelling and deforming the end surface of the one welding sheet member, which faces the other welding sheet member, toward the other welding sheet member, and securing the contact state between the end surfaces through the swelling and deformation.

According to the butt welding method, one of the two sheet members is pressed by the pair of electrode members applied with the power in the thickness direction of the sheet members, and the end surface of the one sheet member facing the other sheet member is swelled and deformed toward the other sheet member by pressing the one sheet member, thereby the contact state of the end surfaces of the two sheet members is reliably secured by the swelling and deformation.

The butt welding method can be also applied to cases in which two sheet members have various thicknesses and are butted in various butt states similarly to the butt welding apparatus described above.

A first specific example of the cases resides in a case in which one of the two sheet members is a thick sheet member having a large thickness and the other of them is a thin sheet member having a small thickness, and the thick sheet member is butted to the thin sheet member by dislocating the both the front and back surfaces of the thin sheet member with respect to the both the front and back surfaces of the thick sheet member and by disposing the thin sheet member within the thickness of the thick sheet member. In this case, power is applied to the thick sheet member while pressing it by the pair of electrode members, and, thereafter, power is also applied to the thin sheet member by causing the pair of electrode members to be in contact with the thin sheet member. With this operation, the butt portion of the thick and thin sheet members is melted by electric resistance heat and a nugget bridging across these sheet members is formed.

A second specific example resides in a case in which the two sheet members have the same thickness, and these sheet members are butted by causing both the front and back surfaces of the sheet members to be in agreement with each other. In this case, power is applied to one of the two sheet members while pressing the one sheet member by the pair of electrode members, and, thereafter, power is also applied to the other sheet member by causing the pair of electrode members to come into contact with the other sheet member. With this operation, the butt portion of the two sheet members is also melted by electric resistance heat, thereby a nugget bridging across these sheet members is formed.

A third specific example resides in a case in which one of the two sheet members is a thick sheet member having a large thickness and the other of them is a thin sheet member having a small thickness, and the thick sheet member is butted to the thin sheet member by causing one of both the front and back surfaces of the thick sheet member to be in agreement with one of both the front and back surfaces of the thin sheet member without step. In this case, power is applied to the thick sheet member while pressing it by the pair of electrode members, and, thereafter, power is also applied to the thin sheet member by causing the pair of electrode members to come into contact with the thin sheet member. As a result, the butt portion of the thick and thin sheet members is melted by electric resistance heat, thereby a nugget bridging across these sheet members is formed.

A fourth specific example also resides in a case in which one of the two sheet members is a thick sheet member having a large thickness and the other of them is a thin sheet member having a small thickness, and the thick sheet member is butted to the thin sheet member by causing one of both the front and back surfaces of the thick sheet member to be in agreement with one of both the front and back surfaces of the thin sheet member without step. In the fourth specific example, power is applied to the thick and thin sheet members through a path obliquely passing through the butt portion by the pair of electrode members while pressing the thick sheet member by these electrode members. With this operation, the butt portion of the thick and thin sheet members is also melted by electric resistance heat, thereby a nugget bridging across these sheet members is formed.

A tailored blank manufactured by the butt welding apparatus and the butt welding method according to the present invention described above can be used in any arbitrary applications by being subjected to post-processing such as press processing and the like executed thereafter, and one example of the applications is a vehicle body of a vehicle and another example thereof is a main body of an electrical appliance.

Further, since a tailored blank manufactured by the third and fourth specific examples described above of the butt welding method is formed in such a shape that one surface of a thick sheet member is jointed to one surface of a thin sheet member without step, the tailored blank can be utilized as products having various applications making effectively use of the feature of the shape.

As an example of the products, the tailored blank is used as an inner panel coupled with an outer panel, a part of the vehicle body of the vehicle is formed of the outer panel and the inner panel, and the surface on the side without step of the tailored blank is used as an outward surface facing the outer panel.

According to this arrangement, since the surface on the side without step is used as the outer surface facing the side of the outer panel, the part of the vehicle body of the vehicle can be formed using the outer panel, which has a good outside appearance that is not influenced by a step, on the outside of the vehicle body.

Further, when the part of the vehicle body of the vehicle is formed by coupling the inner panel manufactured by the tailored blank with the outer panel, the part of the vehicle body may be arranged as a door attached to the main portion of the vehicle body by hinges which can be coupled with the thick sheet member of the thick and thin sheet members forming the inner panel.

According to the above arrangement, since the thick sheet member has large strength due to its large thickness, the hinges can be attached to the thick sheet member making use of the strength thereof.

The door of the vehicle in this case may be a door attached to each side of the vehicle or may be a back door that is also referred to as a tail gate.

An example of another application of the tailored blank manufactured by the third and fourth specific examples described above of the butt welding method resides in a dashboard panel of the vehicle formed of the tailored blank. The dashboard panel is composed of an upper side formed of the thin sheet member and a lower side formed of the thick sheet member, and the surface without step faces a vehicle inside space such as an engine room and the like disposed in front of a driver's seat.

According to the above arrangement, necessary strength can be secured by the lower thick sheet member while reducing a vehicle weight by the upper thin sheet member. Further, the surface without step acts a surface on the side of the vehicle inside space which is exposed to the outside of a compartment when a hood is opened, thereby the accumulation of rain water, which corrodes the butt portion of the thick and thin sheet members, can be prevented.

In the present invention, a positional relationship between the pair of the two electrode members and the two sheet members may be a positional relationship in which the two electrode members are disposed above and below the two sheet members both the front and back surfaces of which face in an up and down direction or may be a positional relationship in which the two electrode members are disposed right and left of the two sheet members both the front and back surfaces of which face in a right and left direction.

Further, the two sheet members in the present invention may be blanks before they are subjected to press processing for punching holes and the like or may be sheet members having been subjected to the press processing.

Further, in the present invention described above, the two sheet members to be subjected to the butt welding means the number of sheet members when they are butt welded to each other. Thus, the present invention includes a case in which a plurality of sheet members are disposed along an end surface a single sheet member and they are subjected to the butt welding.

BRIEF DESCRIPTION OF THE DRAWINGS

FIG. 12 is a side elevational view of a vehicle using a product manufactured from a tailored blank composed of thick and thin sheet members according to the embodiment of FIGS. 8 and 9 and the embodiment of FIGS. 10 and 11 as an inner panel of a door disposed to a side of the vehicle;

FIG. 21 is a view showing a conventional butt welding apparatus at the cross-sectional position of sheet members.

BEST MODE FOR CARRYING OUT THE INVENTION

Figure 1:
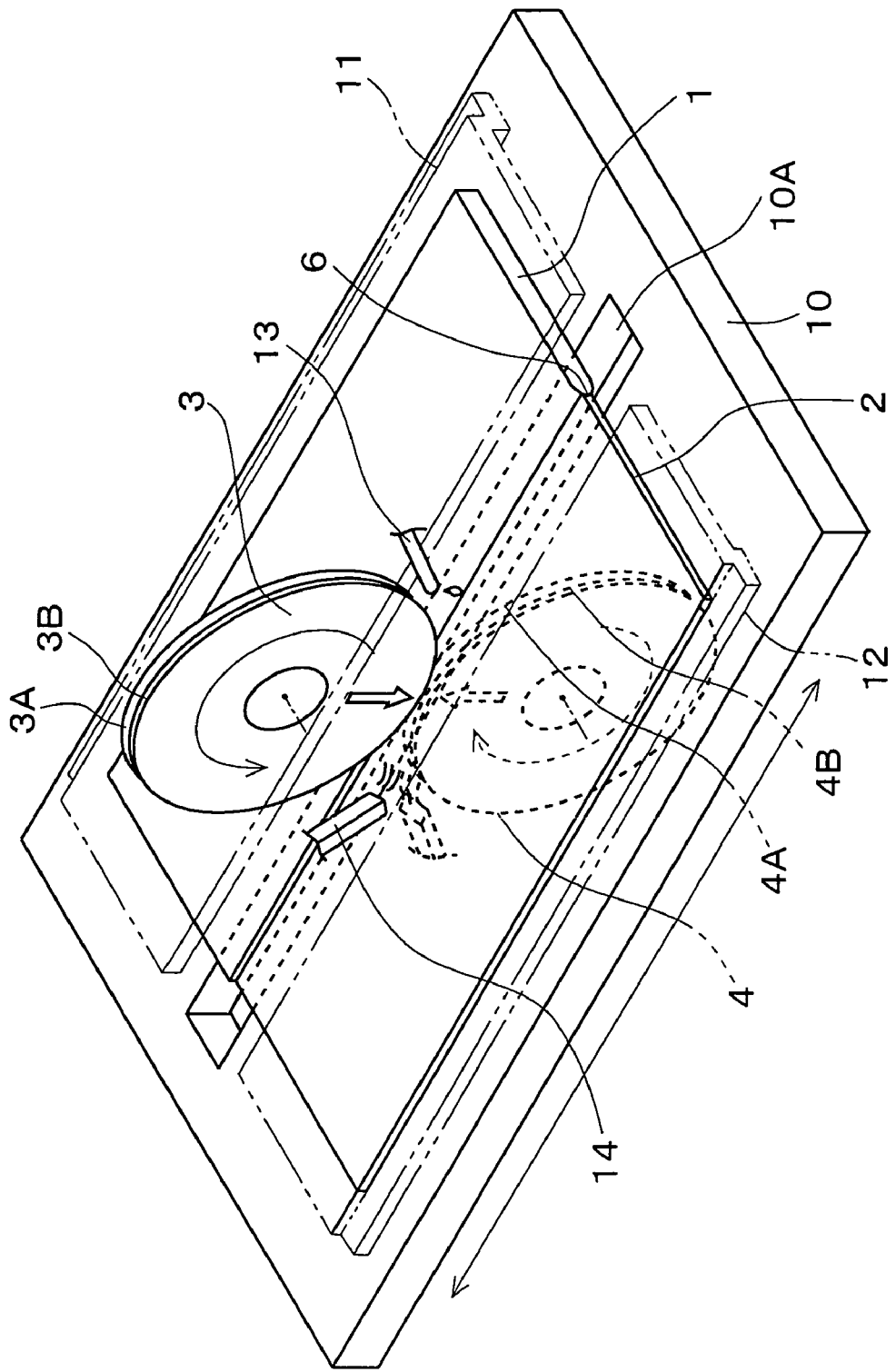
FIG. 1 is a perspective view schematically showing a butt welding apparatus according to an embodiment of the present invention.

The present invention will be described below in more detail with reference to the accompanying drawings. FIG. 1 is a perspective view schematically showing a butt welding apparatus according to an embodiment. Two welding sheet members 1, 2 each composed of a steel sheet or another metal sheet are butted and fixedly set to a work table 10 by fixtures 11, 12. One of the sheet members is a thick sheet member 1 having a large thickness and the other of them is a thin sheet member 2 having a small thickness.

Figure 2:
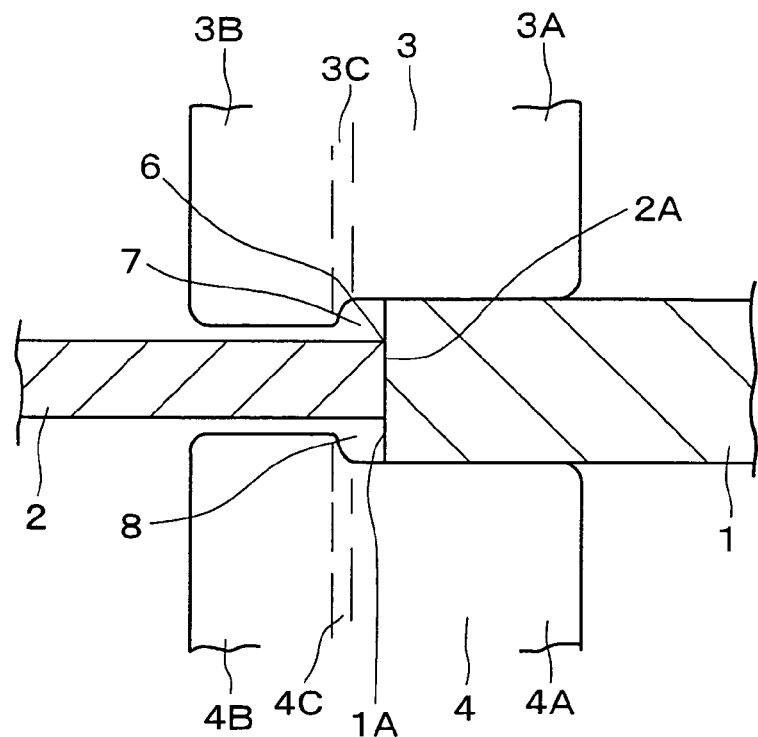
FIG. 2 is a view showing a butted state of two sheet members shown in FIG. 1 at the cross-sectional position of the two sheet members when butt welding starts using electrode rollers as electrode members.

The butt portion 6 of an end surface 1A of the thick sheet member 1 and an end surface 2A of the thin sheet member 2 shown in FIG. 2 is in agreement with the position of a slender opening 10A of the work table 10 shown in FIG. 1, and a pair of two electrode rollers 3, 4 acting as electrode members are disposed above and below the slender opening 10A, in other words, on both the front and back sides of the two sheet members 1, 2 to butt weld the butt portion 6 with electric resistance heat. The upper electrode roller 3 of the electrode rollers 3, 4 each having a thickness bridging across the sheet members 1, 2 moves up and down with respect to the work table 10, the lower electrodes roller 4 also moves up and down at a position where it is inserted into the opening 10A, and these electrode rollers 3, 4 abut against the sheet members 1, 2 and execute butt welding. Further, in the welding, the work table 10 moves in the lengthwise direction of the butt portion 6, thereby the butt portion 6 is melted over its entire length by the electric resistance heat in the sheet members 1, 2 and jointed by the electrode rollers 3, 4 that roll while being applied with power in the welding.

The welding apparatus according to the embodiment is provided with a cooling liquid dropping unit 13 for dropping a cooling liquid such as water or oil onto the portions just behind the portions of the two sheet members 1, 2 butt welded by the electrode rollers 3, 4. Further, the welding apparatus is also provided with an anti-oxidation gas supply unit 14 for supplying an anti-oxidation gas such as an argon gas, a nitrogen gas, etc. onto the portions of the sheet members 1, 2 to be welded by the electrode rollers 3, 4.

As shown in FIG. 2, the thick sheet member 1 is butted to the thin sheet member 2 by dislocating both the front and back surfaces of the thin sheet member 2 from those of the thick sheet member 1 and by disposing the thin sheet member 2 within the thickness of the thick sheet member 1. This butt state is realized by providing a step member such as a spacer and the like, which forms a step between both the sheet members 1, 2, with the work table 10 and/or each of the fixtures 11 and 12 shown in FIG. 1.

Further, as shown in FIG. 2, the two electrode rollers 3, 4 are composed of first portions 3A, 4A disposed on the side of the thick sheet member 1 and second portions 3B, 4B disposed on the side of the thin sheet member 2, the first and second portions 3A, 4A and 3B, 4B being disposed side by side in the thickness direction of these electrode rollers 3, 4, and the second portions 3B, 4B project more than the first portions 3A, 4A in an inward direction of the thickness of sheet members 1, 2, in other words, in a direction where the electrode rollers 3, 4 press the sheet members 1, 2.

That is, since the electrode members according to the embodiment are composed of the electrode rollers 3, 4 in rotation, the first portions 3A, 4A constitute the small diameter portions of the electrode rollers 3, 4 as well as the second portions 3B, 4B constitute the large diameter portions of the electrode rollers 3, 4. An amount of projection of the second portions 3B, 4B with respect to the first portions 3A, 4A is set to such an amount that when the first portions 3A, 4A abut against the thick sheet member 1, the second portions 3B, 4B do not come into contact with the thin sheet member 2.

Further, step portions 3C, 4C acting as boundaries between the first portions 3A, 4A and the second portions 3B, 4B are not in agreement with the position of the butt portion 6 and are dislocated toward the thin sheet member 2. Thus, the first portions 3A, 4A have a thickness extending toward the thin sheet member 2 across the butt portion 6. Accordingly, when the first portions 3A, 4A abut against the thick sheet member 1, gaps 7, 8 are formed between the end surface 1A of the thick sheet member 1 facing the thin sheet member 2 and the second portions 3B, 4B.

Figure 3:
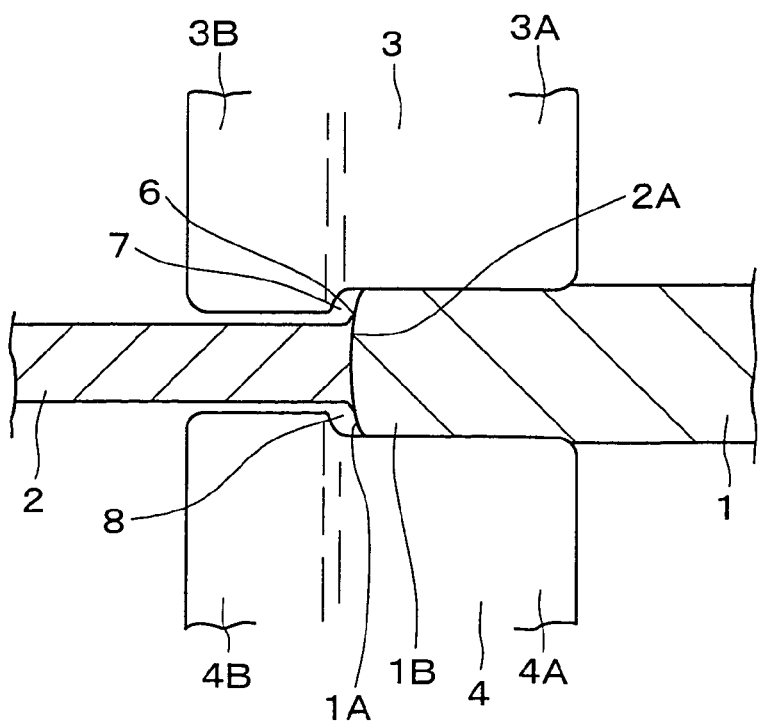
FIG. 3 is a view showing a state following the start of the butt welding at the cross-sectional position of the same sheet members as those shown in FIG. 2.
Figure 4:
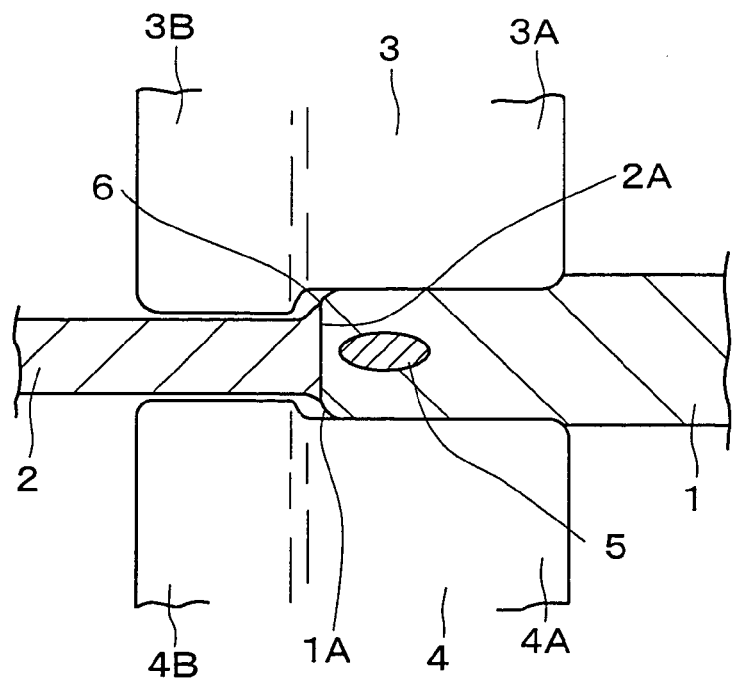
FIG. 4 is a view showing a state further following the state of FIG. 3 at the cross-sectional position of the same sheet members as those shown in FIG. 2.
Figure 5:
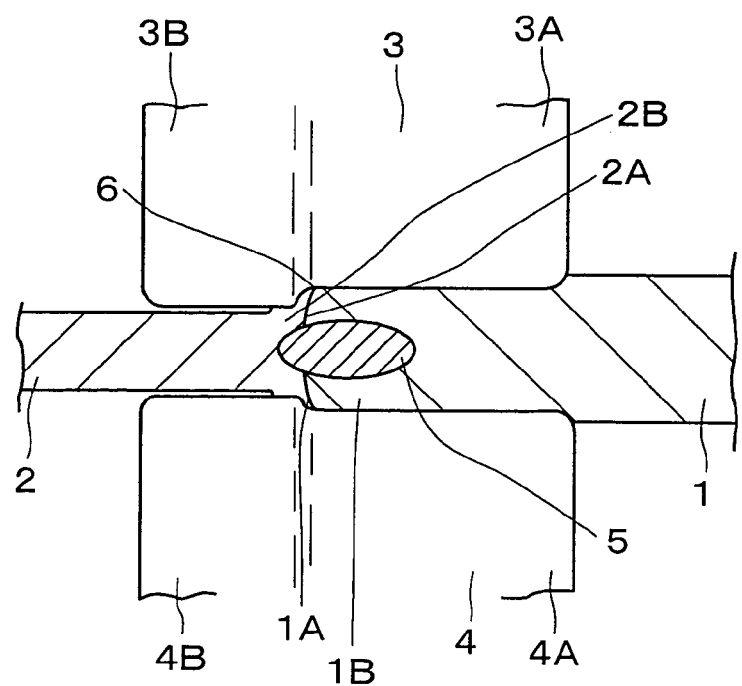
FIG. 5 is a view showing a state in which the butt welding is finished at the cross-sectional position of the same sheet members as those shown in FIG. 2.

FIG. 2 shows a state in which the butt welding is started by the electrode rollers 3, 4, FIGS. 3 to 5 show subsequent processes of the butt welding at the cross-sectional position of the same sheet members 1, 2 as those shown in FIG. 2 according to the sequence of the processes.

As shown in FIG. 2, the butt welding is started by pressing the thick sheet member 1 with the first portions 3A, 4A of the electrode rollers 3, 4. Thus, the first portions 3A, 4A act as press portions for pressing the thick sheet member 1. Further, at the time, power starts to be applied between the electrode rollers 3, 4.

As shown in FIG. 3, when the thick sheet member 1 is more pressed by the first portions 3A, 4A, the end surface 1A of the thick sheet member 1 starts to be swelled and deformed toward the thin sheet member 2 in the gaps 7 and 8 by pressing thick sheet blank 1, and the end surface 2A of the thin sheet member 2 coming into contact with the end surface 1A of the thick sheet member 1 due to the swelling and deformation starts to flatly deform in an outward direction of the thickness of the thin sheet member 2.

As described above, when the end portion 1B of the thick sheet member 1 on the side of the end surface 1A thereof is pressed in the thickness direction of the thick sheet member 1 by the first portions 3A, 4A of the electrode rollers 3, 4, the end surface 1A deforms so as to swell toward the thin sheet member 2. Thus, even if the end surfaces 1A, 2A of the thick and thin sheet members 1, 2 prior to the butt welding remain in a state, in which they are sheared from blank members to manufacture the thick and thin sheet members 1 and 2, and are not subjected to finish processing such as polishing and the like, the end surface 1A reliably comes into contact with the end surface 2A in the butt welding.

When the thick sheet member 1 is much more pressed by the first portions 3A, 4A from the state shown in FIG. 3, a nugget 5 starts to be formed in the thick sheet member 1 applied with power from the electrode rollers 3, 4 at a central portion in the thickness thereof where an electric resistance value is maximized as well as the end surface 1A of the thick sheet member 1 further swells and deforms toward the thin sheet member 2, and the end surface 2A of the thin sheet member 2 more flatly deforms in the outward direction of the thickness thereof, as shown in FIG. 4.

Then, when the butt welding is finished, the thick sheet member 1 is further much more pressed by the first portions 3A, 4A as shown in FIG. 5. Thus, the second portions 3B, 4B of the electrode rollers 3, 4 come into contact with and presses the end surface 2B of the thin sheet member 2, the end surface 2B being a portion near to the end surface 2A of the thin sheet member 2 and swelling in the outward direction of the thickness of the sheet so that the wall thickness thereof is increased.

Thus, at the time, the power from the electrode rollers 3, 4 is also applied to the thin sheet member 2, thereby the nugget 5 is also formed at a central portion of the thin sheet member 2 in the thickness thereof as well as the power is also applied through a path passing through the butt portion 6 of the end surfaces 1A, 2A in contact with each other. Therefore, a material in the vicinity of the butt portion 6 is also melted with the heat generated by the contact resistance of the end surfaces 1A, 2A, and, as a result, the nugget 5 bridges across the thick and thin sheet members 1, 2.

While the above-mentioned is an explanation as to the same cross-sectional positions of the two sheet members 1, 2 to be butt welded, the butt welding, which proceeds from the state shown in FIG. 2 to the state shown in FIG. 5 using the pair of two electrode rollers 3, 4, is executed over the entire length of the butt portion 6 by moving the work table 10 shown in FIG. 1 and rolling the electrode rollers 3, 4 with respect to the sheet members 1, 2 by the move.

Further, when the butt welding is executed as described above, the cooling liquid is dropped from the cooling liquid dropping unit 13 shown in FIG. 1 onto the portions just behind the portions in the two sheet members 1, 2 welded by the electrode rollers 3, 4, and the sheet members 1, 2 are butt welded over the entire lengths thereof while the cooling liquid is being dropped. The cooling executed by dropping the cooling liquid can prevent the expansion and deformation of the two sheet members 1, 2 by which the gap between the portions to be welded from now of the two sheet members 1, 2 is enlarged.

Further, the anti-oxidization gas is supplied from the anti-oxidation gas supply unit 14 onto the portions of the sheet members 1, 2 to be welded by the electrode rollers 3, 4. Thus, the butt welding of the sheet members 1, 2 is executed while preventing the occurrence of rust at the butt portion 6 having been welded.

According to the embodiment described above, the electrode rollers 3, 4 are provided with the first portions 3A, 4A to press the thick sheet member 1 at the start of the butt welding and to swell and deform the end surface 1A of the thick sheet member 1 toward the thin sheet member 2 by pressing it, which permits the end surface 1A to reliably come into contact with the end surface 2A of the thin sheet member 2. Thus, it is not necessary to execute processing for finishing the end surfaces 1A, 2A by polishing and the like as pre-processing to be executed prior to the butt welding, and the butt welding can be executed to the end surfaces 1A, 2A which remain in the state when they were sheared by the shearing apparatus, thereby a working cost of an entire welding operation including the pre-processing can be reduced, a working time can be decreased, and workability can be improved.

Then, since the electrode rollers 3, 4 are provided with the second portions 3B, 4B that come into contact with the thin sheet member 2, a power application path passing through the butt portion 6 is formed by the contact of the second portions 3B, 4B with the thin sheet member 2 and the contact of the first portions 3A, 4A with the thick sheet member 1. Thus, the nugget 5 formed at the central portions of the thick and thin sheet members 1, 2 in the thickness directions thereof bridges across thick and thin sheet members 1, 2 by melting a central portion of the butt portion 6 in the thickness thereof by the electric resistance heat, which can increase the joint strength of the welded thick and thin sheet members 1, 2.

Further, the first portions 3A, 4A of the electrode rollers 3, 4 acting as the press portions for pressing the thick sheet member 1 reach the thin sheet member 2 across the butt portion 6. Thus, when the first portions 3A, 4A press the thick sheet member 1, the end surface 1A of the thick sheet member 1 can be swelled and deformed in the gaps 7 and 8 formed between the end surface 1A and the second portions 3B, 4B, thereby the end surface 1A can be caused to reliably come into contact with the end surface 2A of the thin sheet member 2.

Further, according to the embodiment, while the portions of the two sheet members 1, 2 just after welded by the electrode rollers 3, 4 are made to a high temperature by the heat of the welding, they are cooled with the cooling liquid dropped from the cooling liquid dropping unit 13. Thus, the expansion and deformation, which is arisen when the portions just after being welded remain at the high temperature and increases the gap between portions to be welded from now, can be eliminated or reduced. Accordingly, the end surface 1A of the thick sheet member 1 can be swelled and deformed toward the thin sheet member 2 by the first portions 3A, 4A of the electrode rollers 3, 4 as well as the end surfaces 1A, 2A can be caused to more reliably come into contact with each other.

Further, according to the embodiment, since the anti-oxidization gas is supplied from the anti-oxidation gas supply unit 14 to the portions of the two sheet members 1, 2 to be butt welded by the electrode rollers 3, 4, the butt welding is executed in an anti-oxidization gas atmosphere, which can eliminate or reduce the occurrence of rust at the butt portion 6 having been welded. As a result, when a product is manufactured from a material of a tailored blank composed of the two butted sheet members 1, 2, necessary jobs such as a painting job and the like can be carried out as prescribed.

Figure 6:
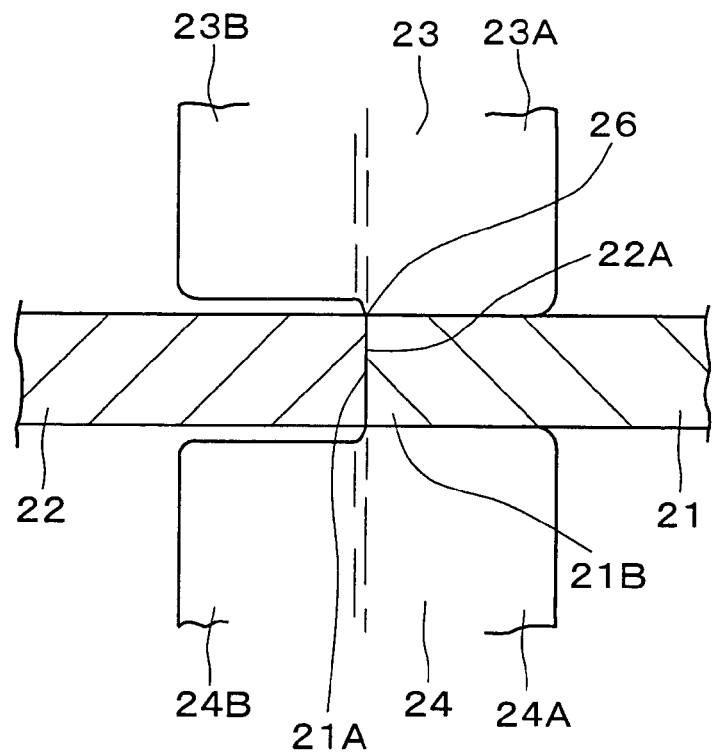
FIG. 6 is a view showing butt welding according to another embodiment at the cross-sectional position of two sheet members when welding starts.
Figure 7:
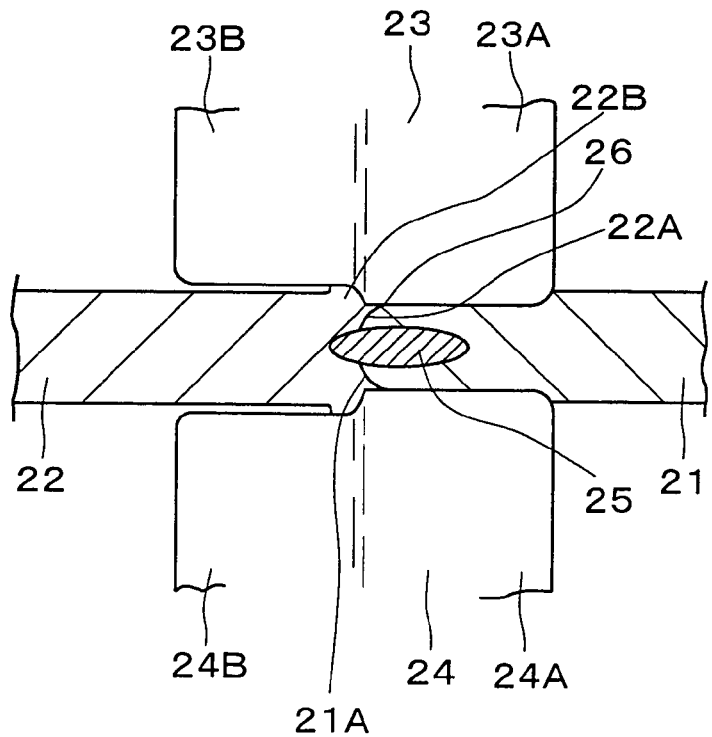
FIG. 7 is a view showing a state in which the butt welding is finished at the cross-sectional position of the same sheet members as those shown in FIG. 6 as to the embodiment of FIG. 6.

FIGS. 6 and 7 show another embodiment. Two welding sheet members 21, 22 in the embodiment have the same thickness, and these sheet members 21, 22 are butted with both the front and back surfaces thereof in agreement with each other. A pair of two electrode rollers 23, 24 disposed on both the front and back sides of the sheet members 21, 22 are composed of first portions 23A, 24A disposed on the side of one of the sheet members 21 and 22, that is, the sheet member 21 and second portions 23B, 24B disposed on the side of the other sheet member 22 also in this embodiment, the first and second portions 23A, 24A and 23B, 24B being disposed side by side in the thickness direction of these electrode rollers 23, 24.

Then, in this embodiment, the second portions 23B, 24B retract in a direction opposite to the press direction of the first portions 23A, 24A acting as press portions for pressing the sheet member 21 in the thickness direction thereof. That is, in the embodiment, the first portions 23A, 24A constitute the large diameter portions of the electrode rollers 23, 24, and the second portions 23B, 24B constitute the small diameter portions thereof.

FIG. 6 shows a state in which butt welding is started by the electrode rollers 23, 24, and FIG. 7 shows a state in which the butt welding is finished at the cross-sectional position of the same sheet members 21, 22 as those shown in FIG. 6. The butt welding starts when the first portions 23A, 24A press an end portion 21B of the sheet member 21 near to an end surface 21A thereof, thereby the end surface 21A swells and deforms toward the sheet member 22 as the end portion 21B is pressed. Thus, the end surfaces 21A, 22A of both the sheet members 21, 22 reliably come into contact with each other.

When the sheet member 21 is pressed by the first portions 23A, 24A to a state shown in FIG. 7, an end portion 22B of the sheet member 22 near to the end surface 22A thereof is swelled and deformed in an outward direction of the thickness of the sheet member and its wall thickness is increased by the swelled and deformed end surface 21A of the sheet member 21. Thus, the second portions 23B, 24B come into contact with the end portion 22B and press the sheet member 22. Accordingly, at the time, a nugget 25 is formed at a central portion in the thickness of the sheet member 21 by the power applied from the first portions 23A, 24A as well as the nugget 25 is also formed at a central portion of the sheet member 22 in the thickness by the power applied from the second portions 23B, 24B. Further, since a power application path is formed in a butt portion 26 where the end surfaces 21A, 22A are butted to each other, the nugget 25 bridges across the two sheet members 21, 22.

Thus, even if the end surfaces 21A, 22A of the two sheet members 21, 22 are not finished by polishing and the like prior to the butt welding of them, a reliable contact state of the end surfaces 21A, 22A can be secured by the action of the first portions 23A, 24A of the electrode rollers 23, 24 as the press portions also in the embodiment. As a result, the power application path passing through the butt portion 26 is formed, and the nugget 25 bridging across the sheet members 21, 22 can be formed.

Note that, in the embodiment, the boundaries between the first portions 23A, 24A and the second portions 23B, 24B are in agreement with the position of the butt portion 26 of the two sheet members 21 and 22 as shown in FIGS. 6 and 7. However, an effect similar to that described above can be obtained even if the boundaries are somewhat dislocated from the butt portion 26 toward the sheet member 21.

Figure 8:
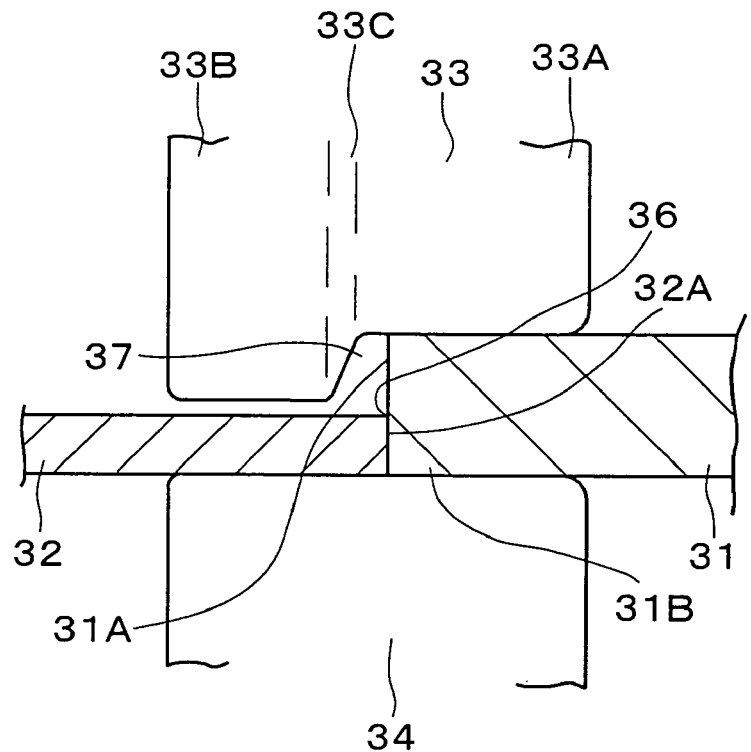
FIG. 8 is a view showing butt welding according to still another embodiment at the cross-sectional position of two sheet members when welding starts.
Figure 9:
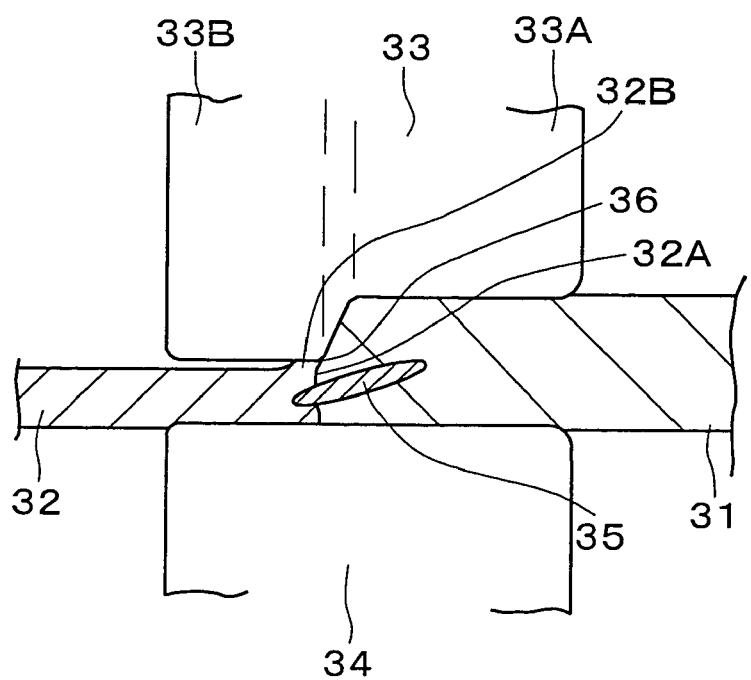
FIG. 9 is a view showing a state in which the butt welding is finished at the cross-sectional position of the same sheet members as those shown in FIG. 8 as to the embodiment of FIG. 8.

FIGS. 8 and 9 show still another embodiment. One of two sheet members 31, 32 in the embodiment is a thick sheet member 31 having a large thickness, and the other of them is a thin sheet member 32 having a small thickness. The thick sheet member 31 is butted to the thin sheet member 32 with the back surface of the thick sheet member 31 in agreement with the back surface of the thin sheet member 32 without step.

Further, of a pair of two electrode rollers 33, 34 disposed on both the front and back sides of these sheet members 31, 32, the electrode roller 33 disposed on the front surface side of the thick and thin sheet members 31, 32 has a first portion 33A on the side of the thick sheet member 31 and a second portion 33B on the side of the thin sheet member 32, the first and second portions 33A and 33B being disposed side by side in the thickness direction of the electrode roller 33, and the second portion 33B projects more than the first portion 33A in a press direction that is an inward direction of the thickness of the sheet member. Further, the electrode roller 34 disposed on the back surface sides of the thick and thin sheet members 31, 32 has a thickness bridging across them similarly to the electrode roller 33. However, the electrode roller 34 is not formed in a shape having portions divided to each of the thick and thin sheet members 31, 32.

Thus, in this embodiment, only the electrode roller 33 is arranged as a roller with a step composed of large and small diameter portions similarly to the electrode rollers 3, 4, 23, 24 in the embodiments described above. However, the electrode roller 34 is arranged as a roller without step having the same diameter continuous in the thickness direction thereof. The electrode roller 34 comes into contact with the two sheet members 31, 32 at the same time.

Further, a step portion 33C acting as the boundary between the first and second portions 33A, 33B of the electrode roller 33 is not in agreement with the position the butt portion 36 of the sheet members 31, 32 and is dislocated toward the thin sheet member 32. Thus, the first portion 33A has a thickness extending toward the thin sheet member 32 across the butt portion 36. Thus, when the first portion 33A abuts against the thick sheet member 31, a gap 37 is formed between an end surface 31A of the thick sheet member 31 facing the thin sheet member 32 and the second portion 33B.

FIG. 8 shows a state in which butt welding is started by the electrode rollers 33, 34, and FIG. 9 shows a state in which the butt welding is finished at the cross-sectional position of the same sheet members 31, 32 as those shown in FIG. 8. The butt welding starts when the first portion 33A of the electrode roller 33 and the portion of the electrode roller 34 corresponding to the thick sheet member 31 act as press portions and press an end portion 31B of the thick sheet member 31 near to the end surface 31A thereof. As the end portion 31B is pressed, the end surface 31A swells and deforms toward the thin sheet member 32. Thus, the end surfaces 31A, 32A of both the sheet members 31, 32 reliably come into contact with each other.

When the thick sheet member 31 is pressed to a state shown in FIG. 9, an end portion 32B of the thin sheet member 32 near to the end surface 32A thereof is swelled and deformed in an outward direction of the thickness of the sheet member by the press load from the swelled and deformed end surface 31A of the thick sheet member 31. Accordingly, at the time, the second portion 33B of the electrode roller 33 comes into contact with the end portion 32B which presses the thin sheet member 32 together with the portion of the electrode roller 34 corresponding to the thin sheet member 32.

Therefore, at the time of FIG. 9, power is applied to both the thick and thin sheet members 31, 32 by the electrode rollers 33, 34. Thus, by the time at the latest, a nugget 35 is formed at a central portion of the thick sheet member 31 in the thickness direction thereof by the power applied thereto as well as the nugget 35 is also formed at a central portion of the thin sheet member 32 in the thickness thereof, and further a power application path is formed in the butt portion 36 of the end surfaces 31A, 32A, thereby the nugget 35 bridges across the two sheet members 31, 32.

Thus, the end surfaces 31A, 32A of the two sheet members 31, 32 can be caused to reliably come into contact with each other even if they are not subjected to finish processing such as polishing and the like prior to the butt welding of them also in this embodiment. As a result, the nugget 35 bridging across the sheet members 31, 32 can be formed.

Further, in this embodiment, since the first portion 33A of the electrode roller 33 has a thickness extending toward the thin sheet member 32 across the butt portion 36 of the thick and thin sheet members 31, 32, the gap 37 is formed between the end surface 31A of the thick sheet member 31 facing the thin sheet member 32 and the second portion 33B of the electrode roller 33. Therefore, when the thick sheet member 31 is pressed by the electrode rollers 33, 34, the end surface 31A of the thick sheet member 31 can be reliably swelled and deformed toward the thin sheet member 32 in the gap 37.

Figure 10:
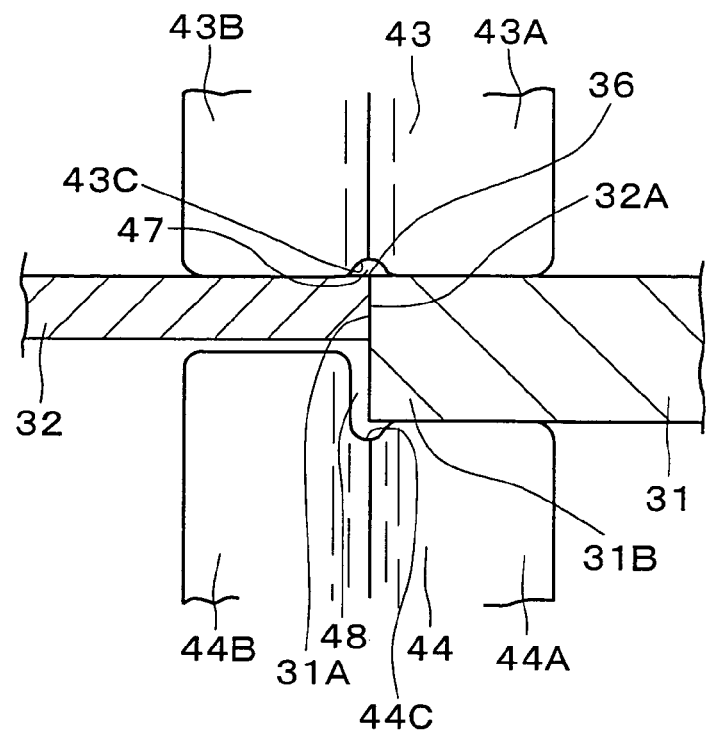
FIG. 10 is a view showing butt welding according to a further embodiment at the cross-sectional position of two sheet members when welding starts.
Figure 11:
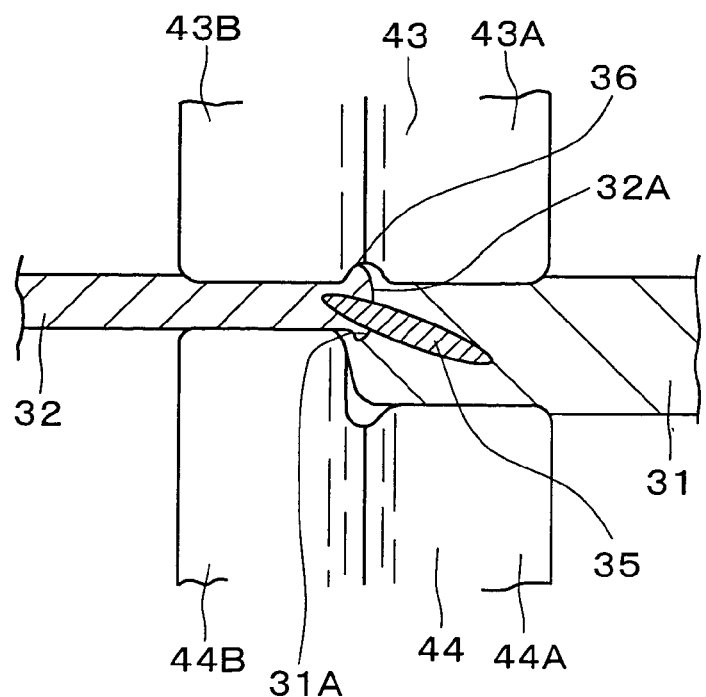
FIG. 11 is a view showing a state in which the butt welding is finished at the cross-sectional position of the same sheet members as those shown in FIG. 10 as to the embodiment of FIG. 10.

FIGS. 10 and 11 show a further embodiment. One of two sheet members is a thick sheet member 31 having a large thickness, and the other of them is a thin sheet member 32 having a small thickness also in this embodiment. The thick sheet member 31 is butted to the thin sheet member 32 with the front surface of the thick sheet member 31 in agreement with that of the thin sheet member 32 without step.

Further, of a pair of two electrode rollers 43, 44 disposed on both the front and back sides of the sheet members 31, 32, the electrode roller 43 disposed on the front surface side of the thick and thin sheet members 31, 32 has a first portion 43A on the side of the thick sheet member 31 and a second portion 43B on the side of the thin sheet member 32, the first and second portions 43A and 43B being disposed side by side in the thickness direction of the electrode roller 43. The first and second portions 43A and 43B project toward the thick and thin sheet members 31, 32 in the same amount. The electrode roller 44 disposed on the back surface sides of the thick and thin sheet members 31, 32 also have a first portion 44A on the side of the thick sheet member 31 and a second portion 44B on the side of the thin sheet member 32, the first and second portions 44A and 44B being disposed side by side in the thickness direction of the electrode roller 44. The second portion 44B of these first and second portions 44A, 44B projects more than the first portion 44A toward the thin sheet member 32.

Thus, in this embodiment, only the electrode roller 44 is arranged as a roller with a step composed of a large diameter portion and a small diameter portion.

Further, in this embodiment, the second portion 43B of the electrode roller 43 and the first portion 44A of the electrode roller 44 have electric conductivity because they are formed of an electrically conductive metal such as copper and the like. In contrast, the first portion 43A of the electrode roller 43 and the second portion 44B of the electrode roller 44 have an electric insulating property because they are formed of an electrically insulating material such as ceramics and the like. That is, in the embodiment, at least the outer peripheral portions of the electrode rollers 43, 44 in contact with the sheet members 31, 32 are formed of different kinds of materials superimposed in the thickness directions thereof.

In this embodiment, when butt welding starts, an end portion 31B of the thick sheet member 31 near to an end surface 31A thereof is pressed by the first and second portions 43A, 44A of the electrode rollers 43, 44. Thus, these first and second portions 43A, 44A act as press portions.

Further, in this embodiment, the boundaries between the first portions 43A, 44A and the second portions 43B, 44B are in agreement with the position of the butt portion 36 of the thick and thin sheet members 31, 32, and recessed portions 43C, 44C, which recess in an inside diameter directions of the electrode rollers 43, 44 are formed in these boundaries. Spaces 47, 48 are formed by the recessed portions 43C, 44C and permit the end surface 31A of the thick sheet member 31 facing the thin sheet member 32 to swell and deform toward the thin sheet member 32 even outside of the thickness of the thin sheet member 32.

FIG. 10 shows a state in which the butt welding is started by the electrode rollers 43, 44, and FIG. 11 shows a state in which the butt welding is finished at the cross-sectional position of the same sheet members 31, 32 as those shown in FIG. 10. The butt welding starts when the first portions 43A, 44A press the end portion 31B of the thick sheet member 31 near to the end surface 31A thereof, thereby the end surface 31A swells and deforms toward the thin sheet member 32 as the end portion 31B is pressed. Thus, the end surface 31A of the thick sheet member 31 reliably comes into contact with the end surface 32A of the thin sheet member 32.

When the thick sheet member 31 is pressed by the first portions 43A, 44A to a state shown in FIG. 11, the second portion 44B of the electrode roller 44 comes into contact with the thin sheet member 32 and presses the thin sheet member 32 together with the second portion 43B of the electrode roller 43 having come into contact with the thin sheet member 32.

Thus, by this time at the latest, a power application path obliquely passing through the butt portion 36 of the end surface 31A of the thick sheet member 31 and the end surface 32A of the thin sheet member 32 is made by the second portion 43B of the electrode roller 43 and the first portion 44A of the electrode roller 44 each having the electric conductivity. Therefore, power is also applied to the thick and thin sheet members 31, 32, thereby the nugget 35 bridging across these sheet members 31, 32 is formed.

Accordingly, even if the end surfaces 31A, 32A of the two sheet members 31, 32 are not subjected to finish processing such as polishing and the like prior to the butt welding thereof, a reliable contact state of the end surfaces 31A, 32A can be secured also in this embodiment. As a result, the nugget 35 bridging across the sheet members 31, 32 can be formed by the power application path passing through the butt portion 36.

Further, in this embodiment, the recessed portions 43C, 44C are formed in the boundaries between the first portions 43A, 44A of the electrode rollers 43, 44 and the second portions 43B, 44B thereof, thereby the spaces 47, 48 are formed from the end surface 31A toward the thin sheet member 32 and permit the end surface 31A of the thick sheet member 31 to swell and deform toward the thin sheet member 32 also outside of the thickness of the thin sheet member 32. As a result, when the thick sheet member 31 is pressed by the first portions 43A, 44A, the end surface 31A of the thick sheet member 31 can be reliably swelled and deformed toward the thin sheet member 32 side, and contact state of the end surface 31A of the thick sheet member 31 with the end surface 32A of the thin sheet member 32 can be secured.

In addition, in the embodiment of FIGS. 10 and 11, the front and back surfaces of the two sheet members 31, 32 may be reversed and the back surface of the thick sheet member 31 may be in agreement with the back surface of the thin sheet member 32 without step similarly to the embodiment of FIGS. 8 and 9, the up/down relationship of the two electrode rollers 43, 44 may be reversed.

According to the respective embodiments described above, tailored blanks composed of the two sheets 1 and 2, 21 and 22, and 31 and 32 can be manufactured. These tailored blanks are subjected to prescribed processing such as press processing and the like so that they can be made to products used in various applications.

Figure 13:
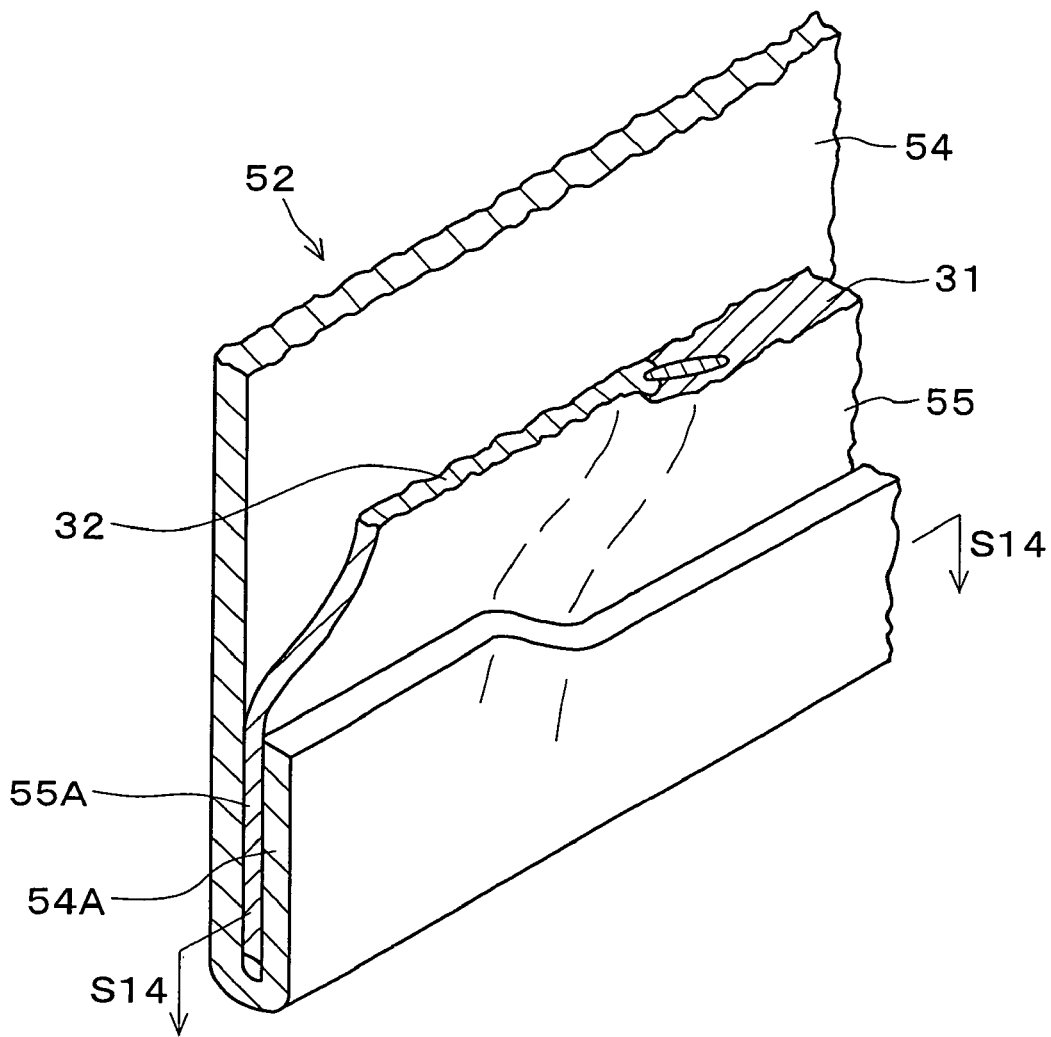
FIG. 13 is a sectional perspective view of a main portion of the door of FIG. 12.

FIG. 12 shows a vehicle body 50 of a four-wheel vehicle using a product manufactured by subjecting the tailored blank made of the thick and thin sheet members 31, 32 according to the embodiment of FIGS. 8 and 9 and the embodiment of FIGS. 10 and 11 to press processing. The vehicle body 50 has a vehicle main body 51 and doors 52 attached to the side surfaces of the vehicle main body 51 so as to open and close through hinges 53. As shown in FIG. 13, each of the doors 52 is formed by coupling an outer panel 54 outside of the vehicle with an inner panel 55 inside of the vehicle, and they are coupled by hemming processing for pressing the turned-back peripheral edge 54A of the outer panel 54 against the peripheral edge 55A of the inner panel 55.

Figure 14:
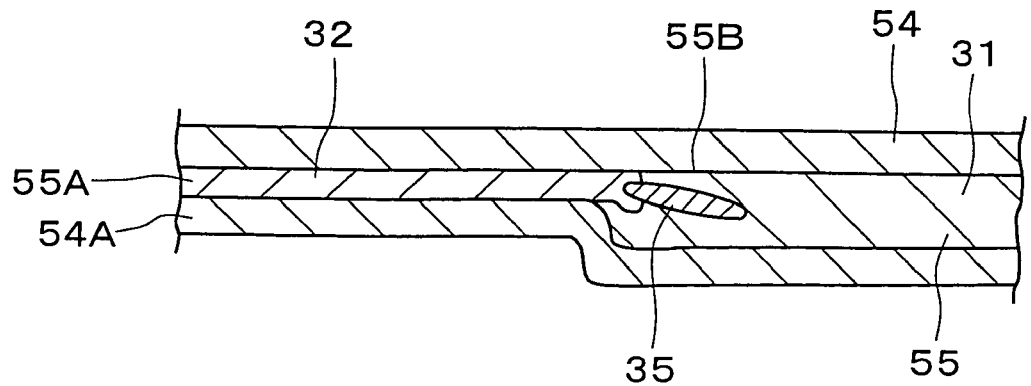
FIG. 14 is a sectional view of FIG. 13 taken along a line S14-S14.

The inner panel 55 is manufactured by subjecting the tailored blank composed of the thick and thin sheet members 31, 32 manufactured by the butt welding of the embodiment of FIGS. 8 and 9 and the embodiment of FIGS. 10 and 11 to press processing. The inner panel 55, which is a product manufactured from the tailored blank, is coupled with the outer panel 54 in which a surface 55B without step of the thick and thin sheet members 31, 32 acts as an outward surface facing the outer panel 54, as shown in FIG. 14 that is a sectional view taken along the line S14-S14 of FIG. 13.

Further, the hinges 53 of FIG. 12 are coupled with the portion of the thick sheet member 31 of the portions forming the inner panel 55 of the thick and thin sheet member 31 and 32.

According to this embodiment, the inner panel 55 is composed of the tailored blank made of the thick and thin sheet members 31 and 32 which are butt welded such that one surfaces thereof have no step, and the surface 55B without step of the inner panel 55 is arranged as the outward surface facing the outer panel 54. Therefore, when door 52 is manufactured by coupling the inner panel 55 with the outer panel 54 by the hemming processing, the outside surface of the door 52 can be provided with a good outside appearance that is not influenced by a step.

Further, since the hinges 53 are coupled with the portion of the thick sheet member 31 having a large thickness and a large strength, they can be attached to the door 52 making use of the strength of the thick sheet member 31. Moreover, the overall weight of the door 52 can be reduced by the thin sheet member 32.

Figure 15:
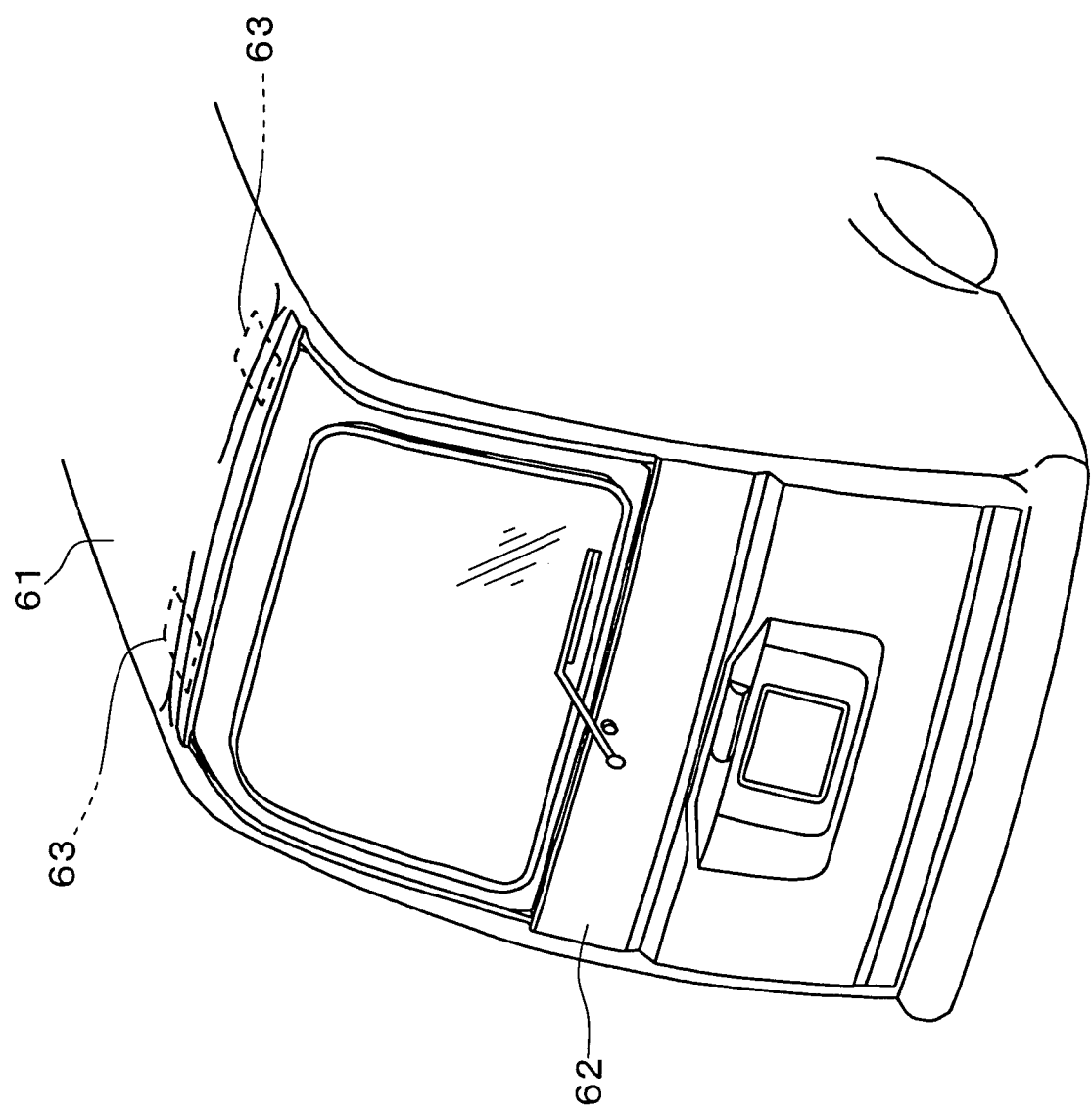
FIG. 15 is a back perspective view of a vehicle using a product manufactured from a tailored blank composed of thick and thin sheet members according to the embodiment of FIGS. 8 and 9 and the embodiment FIGS. 10 and 11 as an inner panel of a back door.

The product manufactured by forming the tailored blank in the predetermined shape by the press processing is used as the inner panel of the door of the vehicle as described above, which can be also applied to a back door 62 that is attached to a four-wheel vehicle main body 61 through hinges 63 and formed by coupling an outer panel with an inner panel as shown in FIG. 15 similarly to the above door 52.

Figure 16:
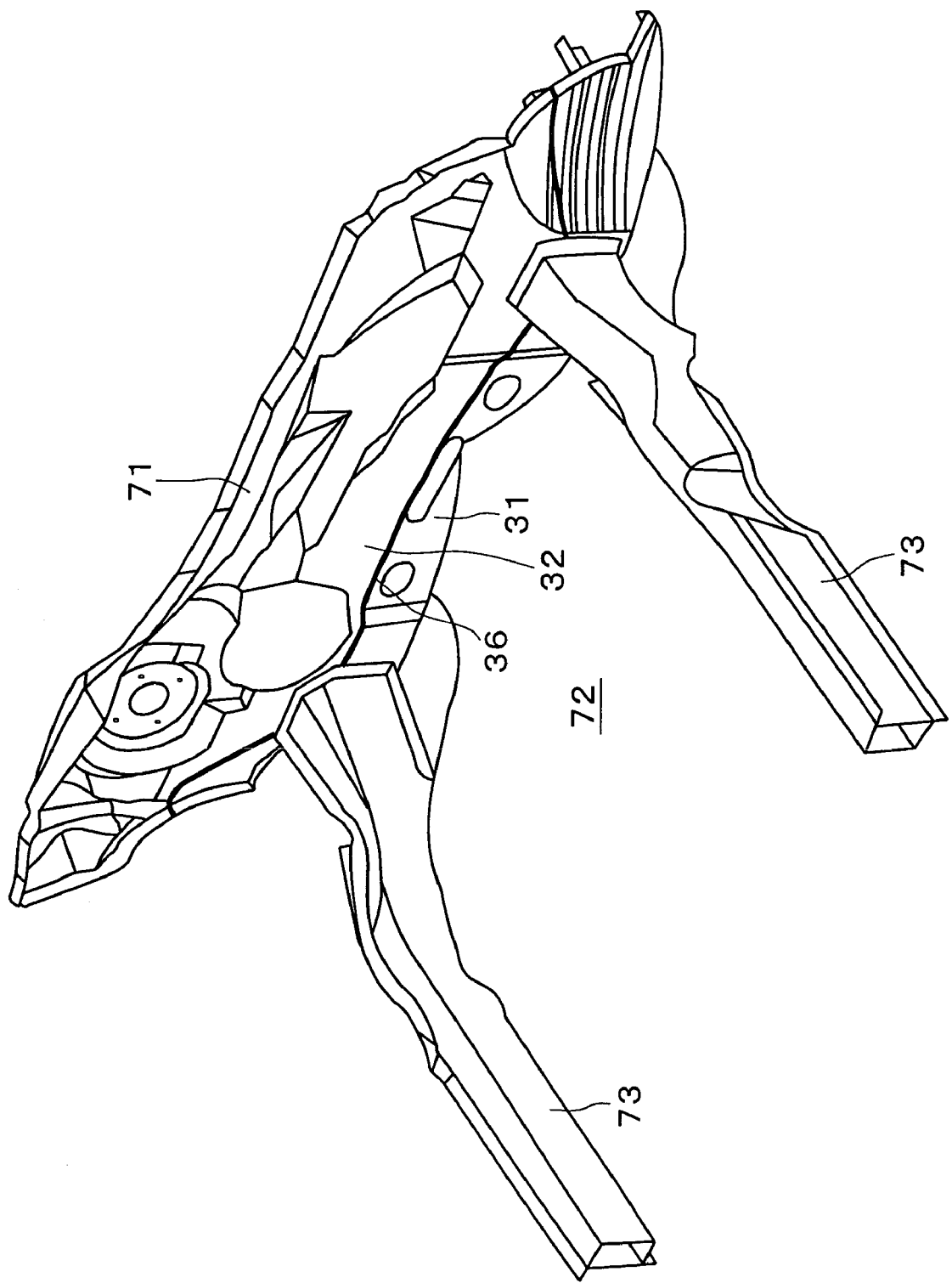
FIG. 16 is a perspective view of a dashboard lower panel as a product manufactured from a tailored blank composed of thick and thin sheet members according to the embodiment of FIGS. 8 and 9 and the embodiment FIGS. 10 and 11 when the dashboard lower panel is viewed from the side of a vehicle inside space such as an engine room and the like disposed in front of a driver's seat.
Figure 17:
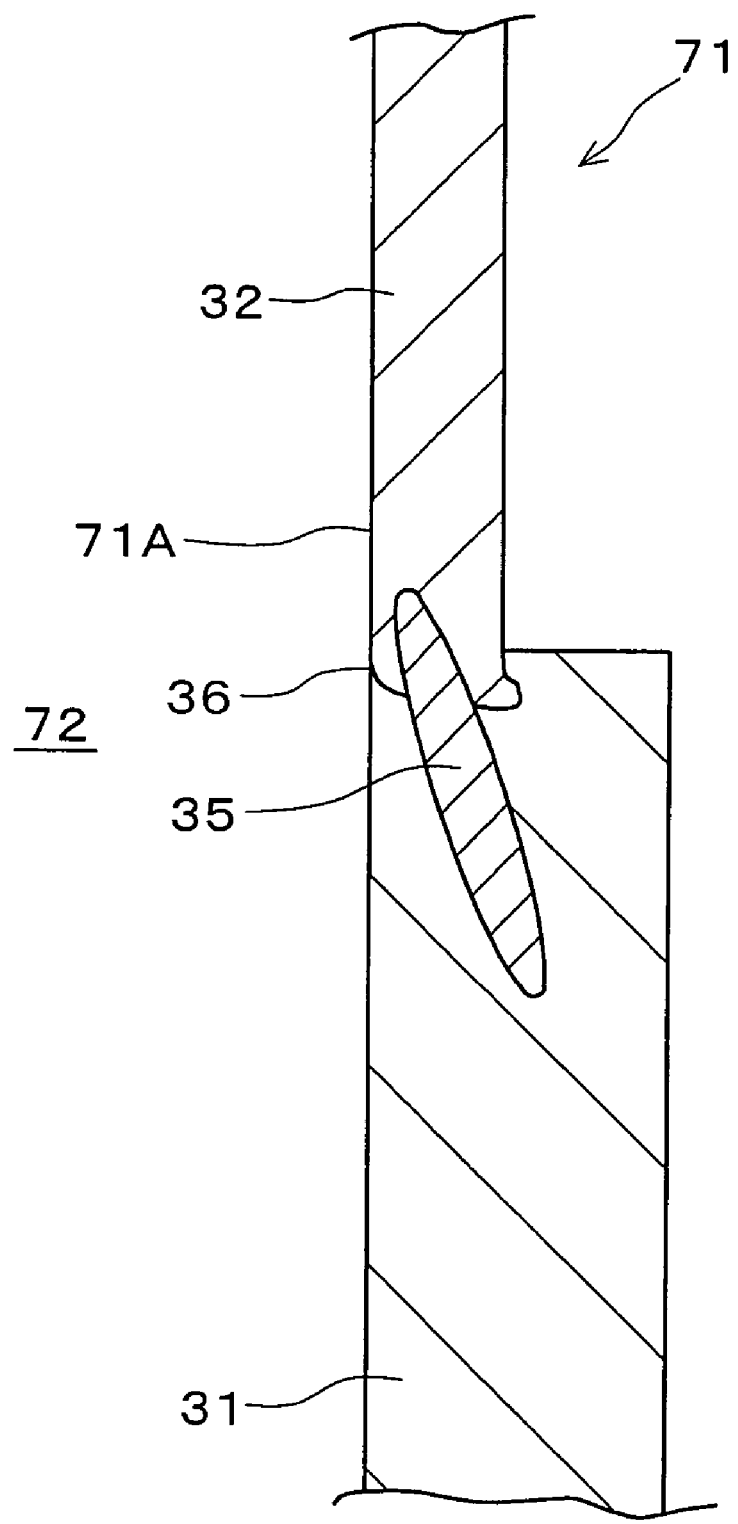
FIG. 17 is a longitudinal sectional view of the dashboard lower panel of FIG. 16.

FIGS. 16 and 17 show another application of the tailored blank. FIG. 16 is a perspective view of a dash board lower panel 71 of an FF (front engine, front drive) and FR (front engine, rear drive) four-wheel vehicle when it is viewed from the side of a vehicle inside space 72 such an engine room and the like disposed in front of a driver's seat. The dash board lower panel 71, which has two side frames 73 whose base end portions are coupled in order to reinforce a vehicle body, is formed by subjecting the tailored blank composed of the thick and thin sheet members 31, 32 to press processing. Further, as shown in FIG. 17 that is a longitudinal sectional view of the dash board lower panel 71, the dash board lower panel 71 is formed of the thin sheet member 32 acting as an upper side and the thick sheet member acting as a lower side 31 as well as a surface 71A without step faces the side of the vehicle inside space 72.

According to the above arrangement, necessary strength can be secured by the lower thick sheet member 31 while reducing a vehicle weight by the upper thin sheet member 32. Further, the surface 71A without step acts as a surface on the side of the vehicle inside space 72 which is exposed outside of a compartment when a hood is opened, thereby the accumulation of rain water, which corrodes the butt portion 36 of the thick and thin sheet members, can be prevented.

Figure 18:
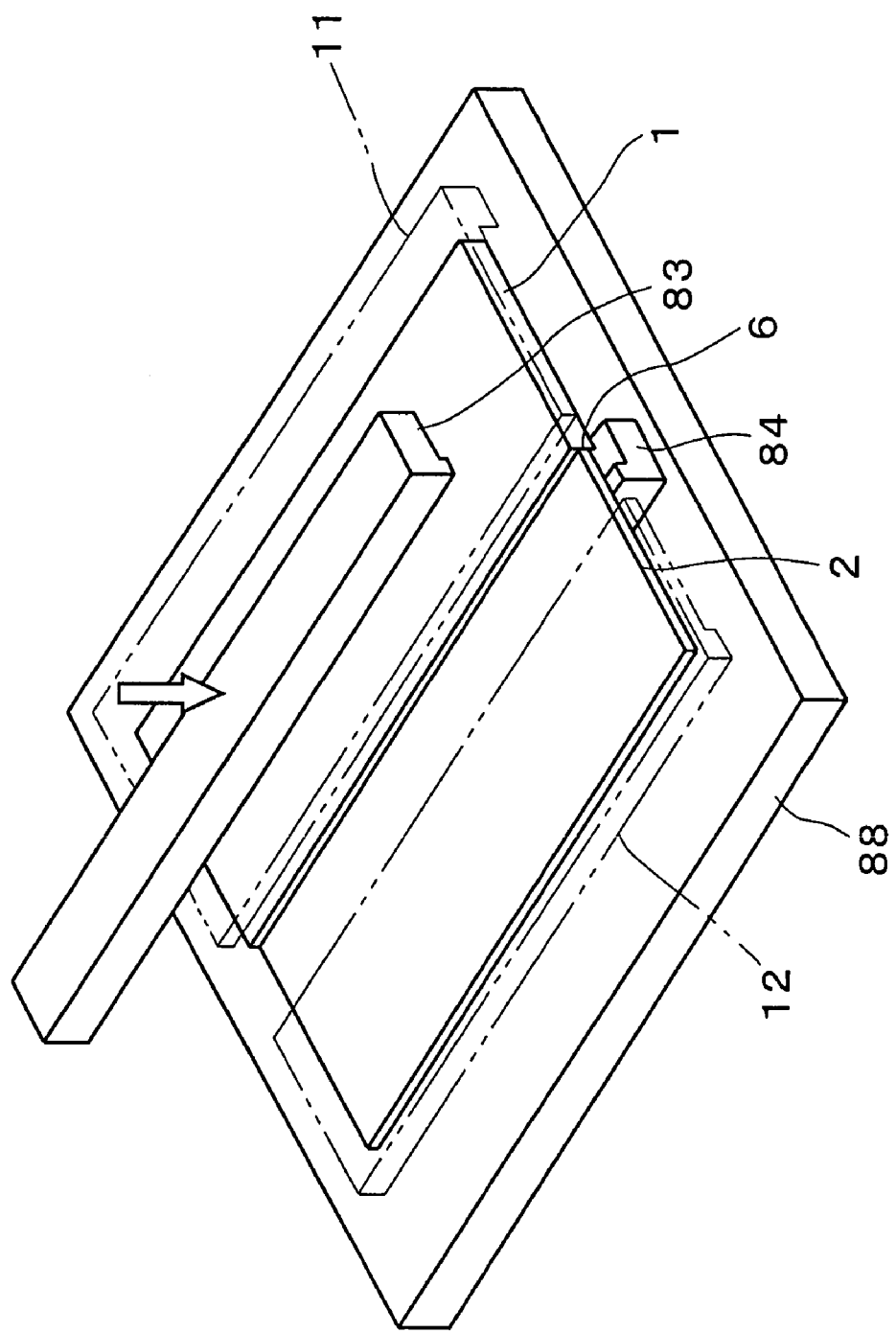
FIG. 18 is a perspective view schematically showing a butt welding apparatus that shows an embodiment using block electrodes as electrode members.
Figure 19:
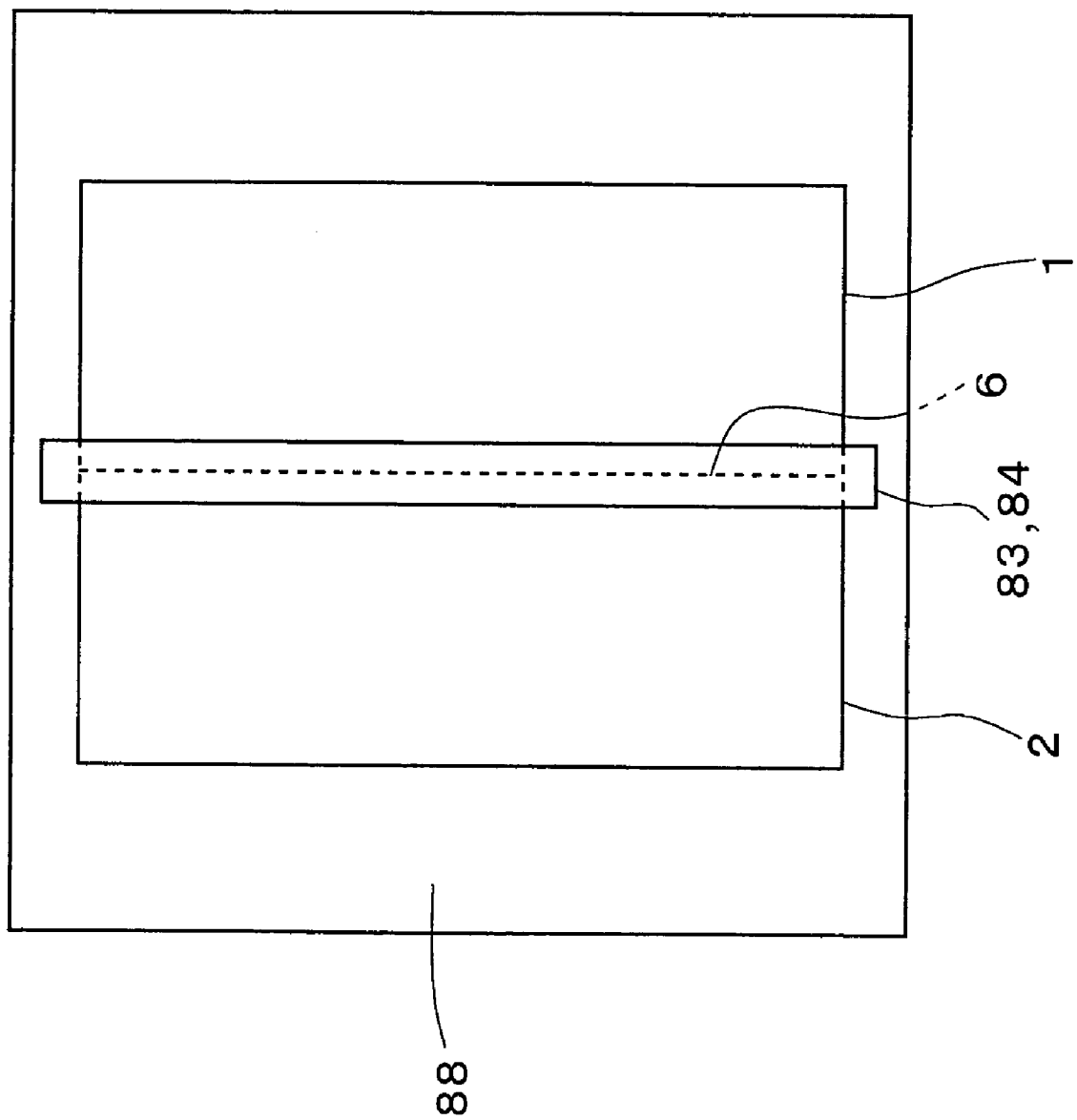
FIG. 19 is a plan view of FIG. 18.

While the pair of two electrode members in the butt welding apparatus in the respective embodiments described in FIGS. 1 to 11 are composed of the electrode rollers, electrode members in an embodiment of FIGS. 18 and 19 are composed of block electrodes 83 and 84 mounted on a press apparatus.

That is, in the embodiment of FIGS. 18 and 19, the block electrode 83 is disposed on an upper side that is the front surfaces side of the thick and thin sheet members 1, 2 as welding sheets, and the block electrode 84 is disposed on a lower side that is the back surfaces side of the thick and thin sheet members 1, 2. Each of the block electrodes 83, 84 has a thickness bridging across the thick sheet member 1 and across the thin sheet member 2. Further, each of the block electrodes 83, 84 has a length linearly extending along the butt portion 6 of the sheet members 1, 2 as shown in FIG. 19 that is a plan view of FIG. 18. The block electrode 83 is attached to a rising/falling member such as a slide and the like moving up and down of the press apparatus, and the block electrode 84 is attached onto an upper surface of a table member 88 coupled with an unmovable member such as a bolster and the like of the press apparatus. The table member 88 has fixtures 11, 12 for butting the thick sheet member 1 to the thin sheet member 2 in a predetermined positional relationship and fixedly setting them on the table member 88.

When the upper block electrode 83 falls with respect to the table member 88, the block electrodes 83, 84 press the butt portion 6, and the press load of them is acts on the thick and thin sheet members 1, 2. At this time, power is applied between the block electrodes 83, 84.

Since the sheet members 1, 2 shown in FIG. 18 are the same as those in the embodiment of FIGS. 1 to 5, the block electrodes 83 and 84 have the same cross sectional shapes as the outer peripheral portions of the electrode rollers 3, 4 shown in FIGS. 1 to 5. Thus, butt welding of the thick and thin sheet members 1, 2 executed by moving the block electrode 83 downward is proceeded in the same sequence as that of FIGS. 2, 3, 4, and 5 also in this embodiment, and the same operation/working effect as that of the embodiment of FIGS. 1 to 5 can be obtained.

In particular, according to this embodiment, since the electrode members are composed of the block electrodes 83, 84, a butt welding operation for one set of the two sheet members 1, 2 can be finished by pressing the butt portion 6 of them by the block electrodes 83, 84 only once. Thus, a time of the butt welding operation can be reduced and efficiency of a multiplicity of butt welding operations can be improved.

Note that, in this embodiment, when the two sheet members are the same as those of the embodiment of FIGS. 6 and 7, the sectional shapes of the block electrodes 83, 84 are formed similarly to the outer peripheral portions of the electrode rollers of the embodiment of FIGS. 6 and 7. Further, when the two sheet members are the same as those of the embodiment of FIGS. 8 and 9 and those of the embodiment of FIGS. 10 and 11, the sectional shapes of the block electrodes 83 and 84 are formed similarly to the outer peripheral portions of the electrode rollers of the embodiment of FIGS. 8 and 9 and the embodiment of FIGS. 10 and 11.

Figure 20:
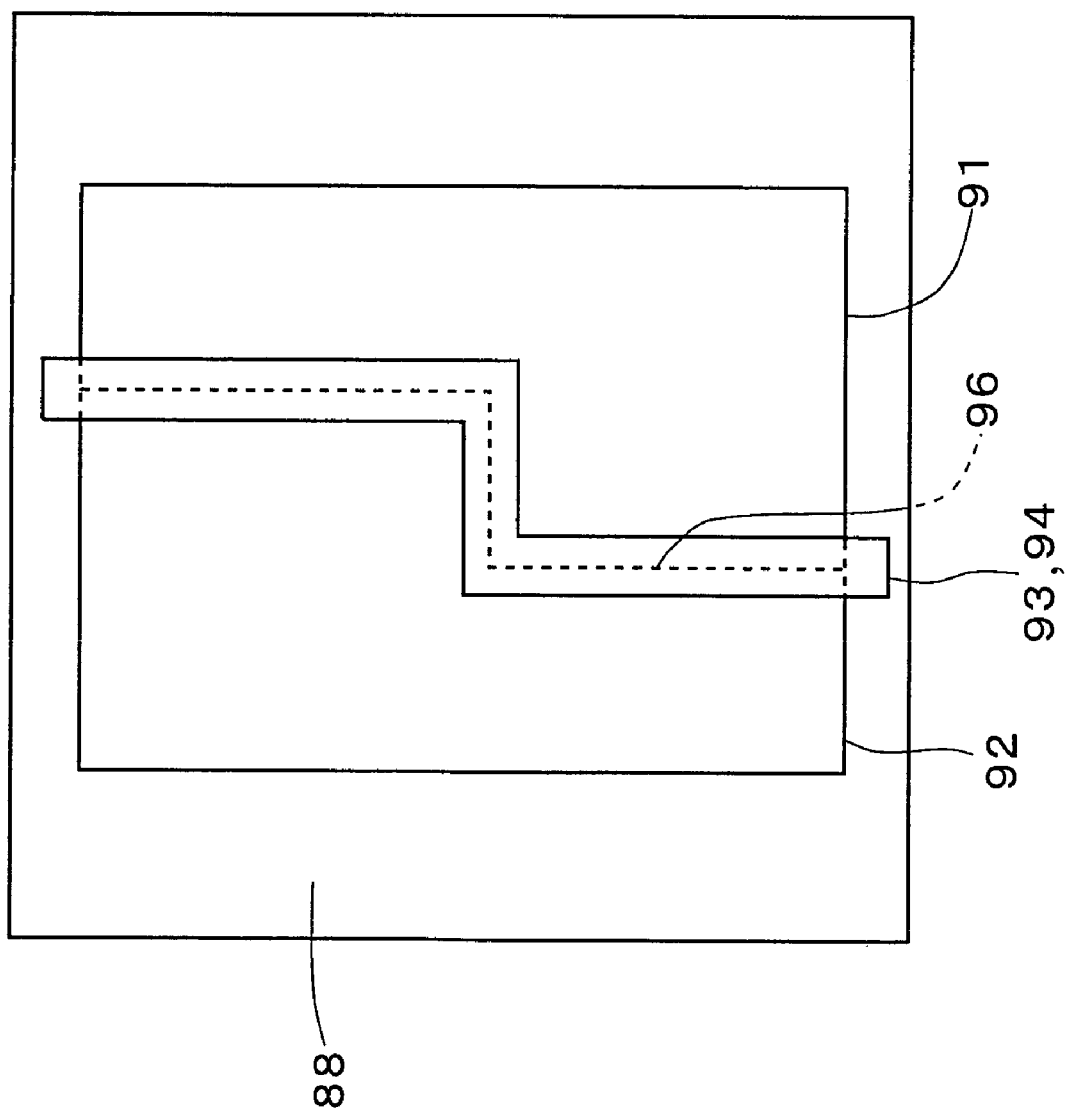
FIG. 20 is a view similar to FIG. 19 and shows an embodiment in which the block electrodes as the electrode members extend non-linearly in correspondence to the butt portion of two sheet members.

FIG. 20 shows another embodiment when the pair of two electrode members are composed of block electrodes. Since end surfaces of two sheet members 91 and 92 in this embodiment are composed of linear lines jointed to each other at right angles, a butt portion 96 formed by butting these end surfaces extends non-linearly. Accordingly, the block electrodes 93, 94 constituting the respective electrode members also extend non-linearly in correspondence to the butt portion 96 to press it.

In this embodiment, the butt welding of the two sheet members 91, 92 executed by moving the upper block electrode 93 downward is carried out similarly to the embodiment of FIGS. 18 and 19.

As can be found from the embodiment, when the electrode members are composed of the block electrodes, the butt portion of two sheet members may extend non-linearly while it is impossible or difficult to butt weld the butt portion when the electrode members are composed of the electrode rollers. Accordingly, an effect can be obtained in that before two sheet members are butted, they are manufactured by being sheared blank members in arbitrary shapes according to, for example, a shape and the like of a product manufactured from the two sheet members as materials butted to each other and the butt shape of the two sheet members can be formed in an arbitrary shape.

INDUSTRIAL APPLICABILITY

As described above, the present invention suitably buttwelds end surfaces of two sheet members to each other by a pair of electrode members applied with power and manufactures a tailored blank for forming a vehicle body of a vehicle and various kinds of members and the like attached to the vehicle body by the butt welding.

What is claimed is:

1. A butt welding apparatus for butt welding end faces of two plate members by electric resistance heating, comprising
    means for supporting the two plate members such that the end faces abut each other and form a butt portion;
    a pair of electrode members disposed opposite to one another for performing electric resistance heat welding of the butt portion, said pair of electrode members comprising a first electrode member provided at a first side of the butt portion and a second electrode member provided at a second side of the butt portion opposite to the first side, said first electrode member being positioned so that it extends across the butt portion and having an outer surface with a press portion and a non-press portion, the first electrode press portion having a stepped surface towards the butt portion, and the second electrode member being positioned so that it extends across the butt portion; and
    means for causing relative movement of the first and second electrode members toward each other and contacting of a surface of one of the plate members with the first electrode member and causing the end face thereof to deform toward the end face of the other plate member, melt, and join therewith.

2. A butt welding apparatus for butt welding end faces of two welding sheet members by electric resistance heating, comprising:
    means for supporting the two welding sheet members such that the end faces abut each other and form a butt portion;
    a pair of electrode members disposed opposite to one another for performing electric resistance heat welding of the butt portion, said pair of electrode members comprising a first electrode member provided at a first side of the butt portion and a second electrode member provided at a second side of the butt portion opposite to the first side, said first and second electrode members extending across the butt portion and comprising press portions for contacting with one of the two welding sheet members and causing the end face thereof to deform toward the other end face, melt and join with the other end face; and
    means for causing relative movement of the first and second electrode members towards each other.

3. The butt welding apparatus according to claim 2, wherein one of the welding sheet members is thicker than the other welding sheet member, said means for supporting the two welding sheet members comprises means for supporting the other welding sheet member in a manner such that the upper surface thereof is disposed in a plane below a plane containing the upper surface of the thicker welding sheet member and the lower surface thereof is disposed in a plane above a plane containing the lower surface of the thicker welding sheet member and each of said first and second electrode members comprising a first portion and a second portion disposed adjacent to each other, the first portions of the electrode members being provided opposite to the thicker welding sheet member and having a stepped surface in the direction of the welding sheet members as compared with the second portions of the electrode members, which are provided opposite to the other welding sheet member.

4. A butt welding apparatus according to claim 3, characterized in that the first portions of the pair of electrode members extend toward the other sheet member across the butt portion of the thicker sheet member and the other sheet member.

5. A butt welding apparatus according to claim 2, characterized in that the two welding sheet members have the same thickness, the means for supporting the two welding sheet members comprise means for supporting the welding sheet members such that front and back surfaces thereof are aligned with each other so as not to form a step difference, each of the pair of electrode members has a first portion on the side of one of the two welding sheet members and a second portion on the side of the other of them, the first and second portions being disposed adjacent to each other, and the second portions retract in a direction away from the welding sheet members with respect to the respective first portions acting as press portions.

6. A butt welding apparatus according to claim 2, wherein one welding sheet member is thicker than the other welding sheet member, the means for supporting the two welding sheet members comprises means for causing the front surface of the thicker sheet member to be aligned with the front surface of the other sheet member or the back surface of the thicker sheet member to be aligned with the back surface of the other sheet member, without a step difference, thereby giving rise to a step difference between one of the front and back surfaces of the thick and thin sheet members, one of the pair of electrode members is disposed at the surfaces of the thick and thin sheet members where the step difference is provided and has a first portion opposed to the thick sheet member and a second portion opposed to the other sheet member, the first and second portions being adjacent to one another and the second portion projecting more than the first portion towards the other electrode member, and the other electrode member has a flat surface for supporting both welding sheet members, and the portion of the other electrode facing the thicker sheet member and the first portion of the one electrode member act as press portions.

7. A butt welding apparatus according to claim 2, wherein one of the two welding sheet members is thicker than the other welding sheet member, the means for supporting the two welding sheet members causing the front surface of the thick sheet member to be aligned with the front surface of the other sheet member or the back surface of the thicker sheet member to be aligned with the back surface of the other sheet member, without a step difference, thereby giving rise to a step difference between one of the front and back surfaces of the welding sheet members, one of the pair of electrode members is disposed at the surfaces of the welding sheet members aligned with each other without a step difference and has a first portion on the side of the thicker sheet member and a second portion on the side of the other sheet member, the first and second portions being adjacent to one another and projecting toward the welding sheet members in the same amount, and the other electrode member also has a first portion facing the thicker sheet member and a second portion facing the other sheet member, the first and second portions of the other electrode member being adjacent to one another and the second portion projecting more than the first portion toward the one electrode member, the second portion of the one electrode member and the first portion of the other electrode member are made of an electrically conductive material, the first portion of the one electrode member and the second portion of the other electrode member are made of an electrically insulating material, and the first portion of the one electrode member and first portion of the other electrode member act as press portions.

8. A butt welding apparatus according to claim 2, characterized in that the pair of electrode members are composed of electrode rollers.

9. A butt welding apparatus according to claim 2, characterized in that the pair of electrode members have a length extending along the butt portion and are composed of block electrodes for applying a press load to the welding sheet members.

10. A butt welding apparatus according to claim 9, characterized in that the butt portion extends non-linearly and the pair of electrode members have a shape extending in correspondence to the butt portion.

11. A butt welding apparatus according to claim 8, comprising a cooling liquid dropping unit for dropping a cooling liquid onto a portion just behind a portion butt welded by the electrode rollers in the two sheet members.

12. A butt welding apparatus according to claim 2, comprising an antioxidation gas supply unit for supplying an anti-oxidation gas onto at least a portion butt welded by the pair of electrode members in the two welding sheet members.

13. A butt welding method for butt welding end faces of two welding sheet members by electric resistance heating, comprising:
  supporting the two welding sheet members such that the end faces abut each other and form a butt portion;
  providing a butt welding apparatus comprising a pair of electrode members disposed opposite to one another for performing electric resistance welding of the butt portion, said pair of electrode members comprising a first electrode member provided at a first side of the butt portion and a second electrode member provided at a second side of the butt portion opposite to the first side;
  positioning the electrode members such that they extend across the butt portion; and
  pressing a surface of one of the welding sheet members while performing electric resistance heating of the one welding sheet member to cause the end face thereof to deform towards the other end face forming the butt portion, melt and join therewith.

14. A butt welding method according to claim 13, characterized in that one of the two welding sheet members is thicker than the other welding sheet member, the thicker sheet member is butted to the other sheet member such that the upper surface of the other welding sheet is disposed in a plane below a plane containing the upper surface of the thicker sheet member and a plane containing the lower surface of the other sheet member is above a plane containing the lower surface of the thicker sheet member, power is applied to the thick sheet member while pressing it by the pair of electrode members, and, thereafter, power is also applied to the thin sheet member by causing the pair of electrode members to come into contact therewith.

15. A butt welding method according to claim 13, wherein the two welding sheet members have the same thickness and are butted by causing both the top and bottom surfaces of the welding sheet members to be aligned with each other, power is applied to the one of the two welding sheet members while pressing the one welding sheet member by the pair of electrode members, and, thereafter, power is also applied to the other welding sheet member by causing the pair of electrode members to come into contact with the other welding sheet member.

16. A butt welding method according to claim 13, wherein one of the two welding sheet members is thicker than the other welding sheet member, the thicker sheet member is butted to the other sheet member by causing the top or bottom surfaces of the welding sheet members to be aligned without a step difference, power is applied to the thicker sheet member while pressing it by the pair of electrode members, and, thereafter, power is also applied to the other sheet member by causing the pair of electrode members to come into contact therewith.

17. A butt welding method according to claim 13, wherein one of the two welding sheet members is thicker than the other welding sheet member, the thicker sheet member is butted to the thin sheet member by causing one of the top and bottom surfaces of the welding sheet members to be aligned without a step difference, and power is applied to the welding sheet members through a path obliquely passing through the butt portion by the pair of electrode members while pressing the thicker sheet member by the electrode members.

* * * * *

UNITED STATES PATENT AND TRADEMARK OFFICE
CERTIFICATE OF CORRECTION

PATENT NO. : 7,307,235 B2 Page 1 of 1
APPLICATION NO. : 10/486273
DATED : December 11, 2007
INVENTOR(S) : Yutaka Miyamoto et al.

It is certified that error appears in the above-identified patent and that said Letters Patent is hereby corrected as shown below:

Column 21, line 36: after "trode" insert --member--.

Column 22, line 18: replace "antioxidation" with --anti-oxidation--.

Signed and Sealed this

Sixth Day of May, 2008

JON W. DUDAS
*Director of the United States Patent and Trademark Office*